United States Patent
Vehovsky et al.

(10) Patent No.: US 10,681,432 B2
(45) Date of Patent: *Jun. 9, 2020

(54) METHODS AND APPARATUS FOR ENHANCING A DIGITAL CONTENT EXPERIENCE

(71) Applicant: Discovery Communications, LLC, Silver Spring, MD (US)

(72) Inventors: Gabriel G. Vehovsky, Evanston, IL (US); Kurt Andrew Merriweather, Silver Spring, MD (US); David Ross Speigel, Wheeling, IL (US); Won J. You, Chicago, IL (US)

(73) Assignee: Discovery Communications, LLC, Silver Spring, MD (US)

( * ) Notice: Subject to any disclaimer, the term of this patent is extended or adjusted under 35 U.S.C. 154(b) by 33 days.

This patent is subject to a terminal disclaimer.

(21) Appl. No.: 15/639,900

(22) Filed: Jun. 30, 2017

(65) Prior Publication Data

US 2017/0303010 A1  Oct. 19, 2017

Related U.S. Application Data

(63) Continuation of application No. 14/357,140, filed as application No. PCT/US2012/066839 on Nov. 28, 2012, now Pat. No. 9,729,942.

(60) Provisional application No. 61/564,123, filed on Nov. 28, 2011.

(51) Int. Cl.
*G06F 3/0484* (2013.01)
*H04N 21/854* (2011.01)
*G06F 16/40* (2019.01)
*H04N 5/76* (2006.01)
*H04N 9/82* (2006.01)
*H04N 5/765* (2006.01)

(52) U.S. Cl.
CPC ......... *H04N 21/854* (2013.01); *G06F 3/0484* (2013.01); *G06F 16/40* (2019.01); *H04N 5/76* (2013.01); *H04N 9/8205* (2013.01); *H04N 5/765* (2013.01)

(58) Field of Classification Search
CPC ...... G06F 3/0484; G06F 16/40; H04N 21/854
See application file for complete search history.

(56) References Cited

U.S. PATENT DOCUMENTS 6,904,263 B2   6/2005  Grudnitski et al.
7,600,170 B2 * 10/2009  Gaal ................. H04J 13/0048
                                                    714/748

(Continued)

OTHER PUBLICATIONS

International Preliminary Report on Patentability for corresponding international application PCT/US2012/066839 dated Jun. 3, 2014 (6 pages).

(Continued)

*Primary Examiner* — Phenuel S Salomon
(74) *Attorney, Agent, or Firm* — J.A. Lindeman & Co., PLLC

(57) ABSTRACT

Aspects of the present invention include methods and associated apparatuses that enhance a digital content experience. The methods and associated apparatuses may receive a selection of a video to view and determine a variety of content related to the selected video. The related content may be presented to a viewer which the video is playing.

10 Claims, 23 Drawing Sheets

(56) References Cited

U.S. PATENT DOCUMENTS

| | | | |
|---|---|---|---|
| 7,747,655 B2* | 6/2010 | Hull | G06K 15/00 |
| | | | 707/802 |
| 8,046,028 B2* | 10/2011 | Kim | H04B 7/0626 |
| | | | 455/562.1 |
| 2002/0083471 A1* | 6/2002 | Agnihotri | G11B 27/105 |
| | | | 725/137 |
| 2002/0163532 A1* | 11/2002 | Thomas | G11B 27/105 |
| | | | 715/723 |
| 2003/0016673 A1* | 1/2003 | Pendakur | H04H 60/11 |
| | | | 370/394 |
| 2003/0088687 A1 | 5/2003 | Begeja et al. | |
| 2003/0107592 A1* | 6/2003 | Li | G06F 16/7844 |
| | | | 715/745 |
| 2005/0182792 A1* | 8/2005 | Israel | H04N 21/81 |
| 2007/0055986 A1* | 3/2007 | Gilley | G06Q 30/0241 |
| | | | 725/34 |
| 2007/0245243 A1* | 10/2007 | Lanza | G06Q 30/0277 |
| | | | 715/723 |
| 2007/0276790 A1* | 11/2007 | Walsh | G06F 16/95 |
| 2008/0065943 A1* | 3/2008 | Botha | H04L 1/1829 |
| | | | 714/748 |
| 2008/0183698 A1* | 7/2008 | Messer | H04N 7/17309 |
| 2008/0187279 A1* | 8/2008 | Gilley | G06Q 30/02 |
| | | | 386/250 |
| 2009/0160859 A1* | 6/2009 | Horowitz | G06T 11/206 |
| | | | 345/440 |
| 2009/0216742 A1* | 8/2009 | Coffman | G06F 16/61 |
| 2009/0276674 A1* | 11/2009 | Wei | H04L 1/16 |
| | | | 714/749 |
| 2009/0319516 A1 | 12/2009 | Igelman et al. | |
| 2010/0097949 A1* | 4/2010 | Ko | H04B 7/0417 |
| | | | 370/252 |
| 2011/0145428 A1 | 6/2011 | Wei et al. | |

OTHER PUBLICATIONS

International Search Report for corresponding application PCT/US2012/066839 dated Feb. 8, 2013.

* cited by examiner

METHODS AND APPARATUS FOR ENHANCING A DIGITAL CONTENT EXPERIENCE

CROSS-REFERENCE TO RELATED APPLICATIONS

This application is a continuation of U.S. patent application Ser. No. 14/357,140, filed May 8, 2014, which is a U.S. National Stage application of PCT/US2012/066839, filed Nov. 28, 2012, which claims priority to U.S. Patent Application No. 61/564,123, filed Nov. 28, 2011. The disclosures of the prior applications are hereby incorporated in their entirety by reference.

BACKGROUND

Today's electronic devices, such as computers, tablets, smart phones, personal digital assistants (PDAs), etc., enable users to access and/or download various videos on-line. A user may access and/or download a video from an on-line content provider to play on the user's electronic device. Typically, when a selected video is played, the video will be the only content item being displayed to the user. If a user wants to perform other tasks and/or view other content on the electronic device, the user generally has to interrupt the video experience to engage with other online experiences.

Thus, it would be desirable to provide a mechanism that allows a video to be played while presenting additional contextually relevant content to the viewer of the video in a single, related experience. It would be further desirable to provide mechanisms that can use elements of the video as a dynamic search query to present additional related content to the video while the user is viewing the video. In addition, it would also be desirable to provide mechanisms that can recommend video selections and associated related content for users to view.

SUMMARY

The following presents a simplified summary of one or more aspects of the present invention in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present invention include methods and associated apparatuses that, among other things, enhance a digital content experience, such as a video selection, recommendation and related content viewing experience. The methods and associated apparatuses may recommend a selection of a video for a user to view, for example, based upon the user's preferences and/or browsing behaviors. The methods and associated apparatuses may also receive a selection of a video to view and determine a variety of related content to the selected video. The related content may be presented to the viewer while the video is being played. Thus, a viewer may be able to view a video while accessing and/or interfacing with a variety of related content to the video on a single screen, without having to stop the video and/or transition to another interface to access or interact with the related content.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIGS. 9A-9M present illustrations of example graphical user interface (GUI) screens illustrating exemplary implementations of aspects of the present invention;

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Aspects of the present invention relate to methods and apparatuses for leveraging a video viewing experience, such as a video selection, recommendation and related content viewing experience. In one aspect, the methods and associated apparatuses use a selected video as a consumer interest indicator to determine and/or recommend other content that a viewer of the video may also be interested in. For example, a viewer may signal interest in content by: reviewing and/or rating content, providing comments on content, sharing content with other users, and selecting content to view and/or access. In an aspect, the methods and apparatuses may use a video transcript as a search query to search content databases to determine other related content to the selected video. The related content may be presented to a viewer while the video is being played. Thus, a viewer may be able to view a video while viewing and/or accessing a variety of related content, without having to stop the video and/or transition to another interface to access the related content (e.g., the video and related content may be presented contemporaneously within the same interface). Therefore, the apparatus and methods may provide a video viewing experience that promotes content multitasking while viewing a video.

The methods and associated apparatuses may also allow viewers to navigate to specific time markers in the video from the related content. For example, when viewers access an item of related content associated with a time marker in the video, the video may move to the time marker associated with the accessed related content. Thus, viewers may be able to go back from the related content to the time marker in the video where it occurs.

In one aspect, the videos and content presented to a viewer may be owned by a single content provider. Thus, as the user selects videos to play, the content provider may select other content to present to the user from within the content providers' data repository. Video and content may also be owned by third party content providers and presented as the user selects videos to play.

Figure 1:
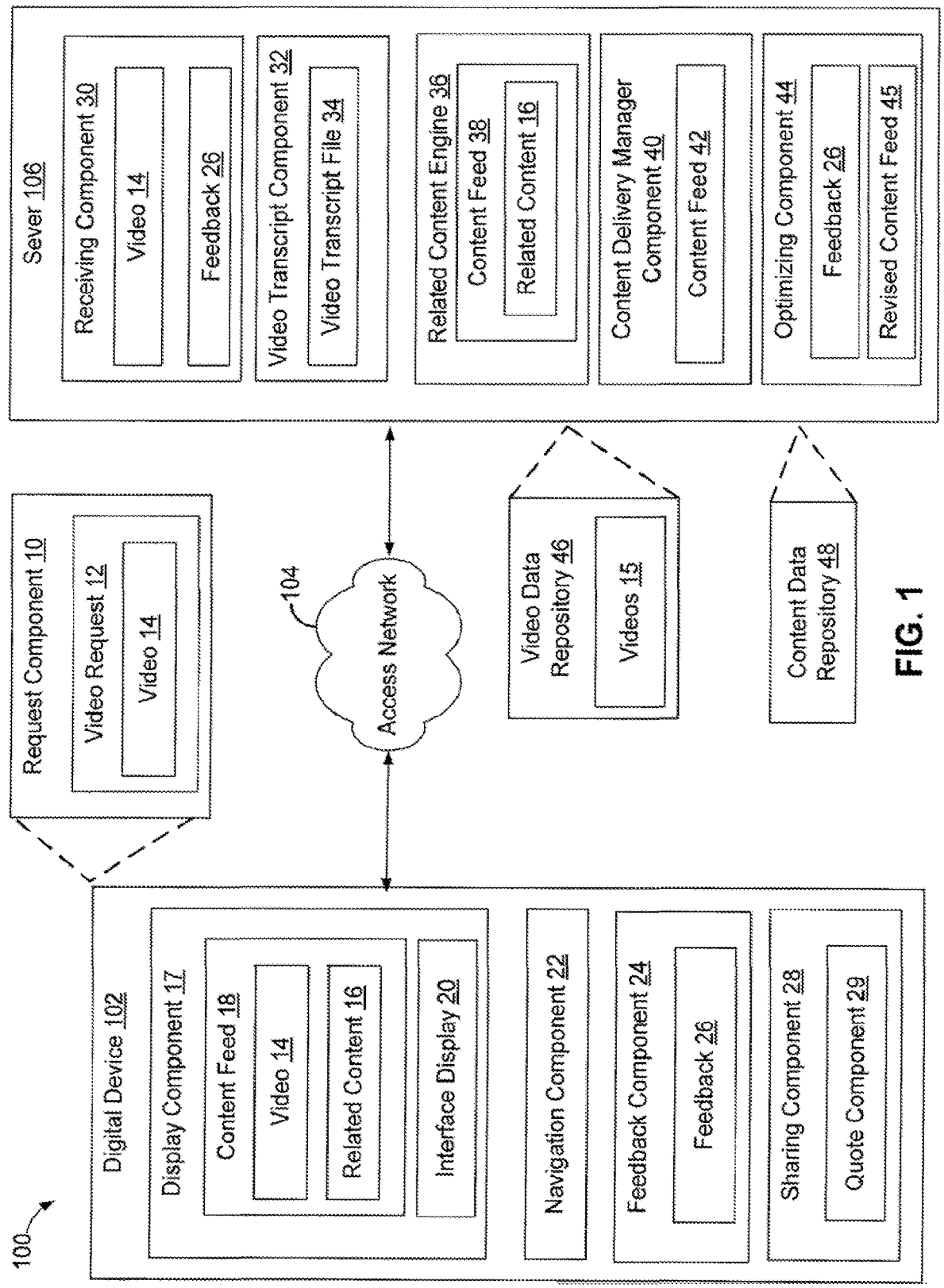
FIG. 1 is an illustration of a connectivity system in accordance with an aspect of the present invention.

Referring now to FIG. 1, illustrated therein is an example connectivity system 100 for implementing various aspects of the present invention. Digital device 102 is communicatively coupled to server 106 via an access network 104, such as the Internet. Digital device 102 may include any suitable mobile, portable computing or communications device, such as a cellular device, coupled to a server, such as a PC, minicomputer, mainframe computer, microcomputer, or other device having a processor and a repository for data and/or connection to a repository for data, via, for example, an access network, such as the Internet or an intranet. For example, digital device 102 may include a cellular telephone, a navigation system, a global positioning system (GPS), a computing device, a camera, a personal digital assistant (PDA), personal computers (PCs), tablets, minicomputers, mainframe computers, microcomputers, telephonic devices, or other handheld device having wireless connection capability, among other devices. Server/computing device 106 may include any mobile or fixed computing device connected to a network. Sever/computing device 106 may include, but is not limited to, a computing device, a server, a cellular telephone, a camera, a PDA, a music device, a gaming device, a navigation system, or a handheld device having wireless connection capability, among other devices. Furthermore, access network 104 may provide one or more types of communication connections, such as any type of wireless airlink, to digital device 102 and server 106.

Digital device 102 may receive a video 14 selected by a user of digital device 102 and present the selected video 14 on interface display 20. Digital device 102 may also receive related content 16 associated with the selected video 14 from server 106 and present the related content 16 concurrently with the video 14 on interface display 20. Digital device 102 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, digital device 102 may include one or more output devices, including but not limited to a display, a speaker, or any other mechanism capable of presenting an output to a user.

In addition, digital device 102 may interface with a request component 10 operable to receive a video request 12 for video 14 from a user of digital device 102. In an aspect, digital device 102 may be communicatively coupled to request component 10 via, for example, access network 104. Digital device 102 may communicate the received video request from the user of digital device 102 to request component 10. Request component 10 may present a user with recommended videos that are available for viewing from a content provider. The user may select a video to view, for example, by clicking on a title and/or an image of the video, using a drop down menu, or inputting text to select video, among other user interface mechanisms for inputting information.

In an aspect, upon selecting a video to view, the user may be prompted with an option to select whether to pay a price to view a video without sponsor advertisements. For example, a user may pay a nominal fee, e.g., $0.99, to view videos for a day without viewing the sponsor advertisements or select to pay more, e.g., $4.99, to watch videos for a month without viewing the sponsor advertisements. The user may also be provided with an option to select to view a video for free with sponsor advertisements. In an aspect, the user may select which sponsors advertisements they would like to view, e.g., the user may select the category of technology for which to view advertisements from technology sponsors. Thus, the user may tailor the video viewing experience by electing not to receive sponsor advertisements and/or electing which categories of advertisements the user would like to view.

In another aspect, server 106 may select videos to present to a user based upon user preferences, user demographics (e.g., age, gender), and/or user browsing behavior. For example, if the user's browsing behavior indicates that the user accesses articles about cooking on a frequent basis, server 106 may select a cooking video to present to the user.

Request component 10 may send the video request 12 along with the identified video 14 to server 106. Server 106 may have a receiving component 30 operable to receive the video request 12 from request component 10 and retrieve the identified video 14. For example, receiving component 30 may access a video data repository 46 with a plurality of videos 15 and retrieve the identified video 14 from the video data repository 46.

Request component 10 may send the retrieved video 14 to video transcript component 32 for processing. Video transcript component 32 may generate a video transcript file 34 by receiving the retrieved video 14 and converting the audio of video 14 into text.

Figure 2:
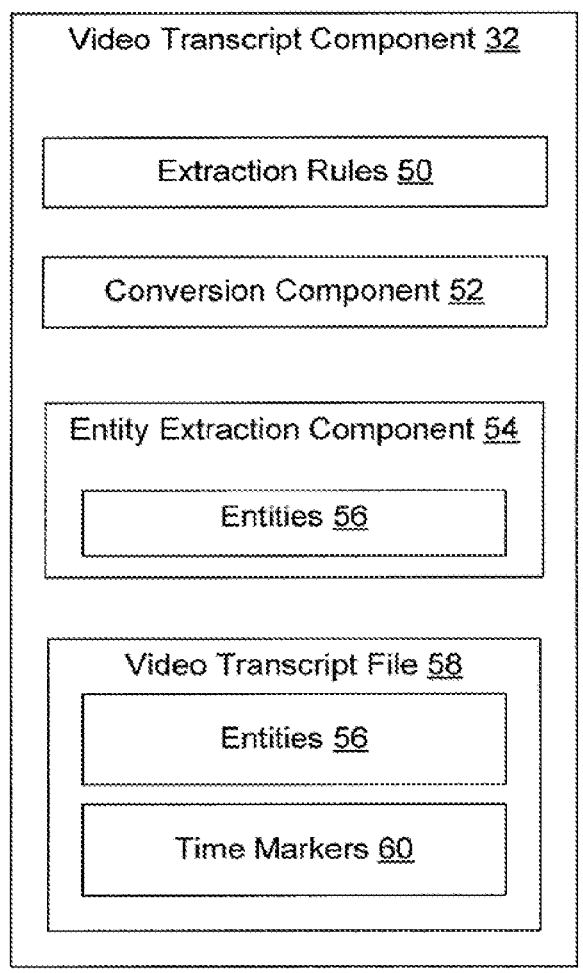
FIG. 2 is an illustration of an example video transcript component operable within the connectivity system in accordance with another aspect of the present invention.

Video transcript component 32 may also include a conversion component 52 operable to convert the audio of video 14 into text. For example, conversion component 52 may use one or more speech-to-text technologies when converting the audio into text. Referring now to FIG. 2, video transcript component 32 may apply one or more extraction rules 50 to video 14. Extraction rules 50 may determine how meaning of the text transcript should be determined. For example, the extraction rules may identify specific character names in the video, locations in the video (e.g., geographical locations, restaurants, stores, shopping centers, cafes, etc.), and social media accounts associated with the characters in the video (e.g., hashtags, account information, etc.) and may determine how the identified information should be processed. In addition, the extraction rules may define words that may be disambiguated by definition and/or context.

Video transcript component 32 may further include an entity extraction component 54 operable to extract one or more entities 56 from the text of the video. Entity extraction component 54 may use the one or more extraction rules or lists 50 to identify and classify specific terms in the text transcript of the video. For example, the identified terms in the video may be categorized into entities by using natural language processing to identify key concepts in the video (e.g., vanilla cake) and may improve the entity extraction process. In addition, the extraction may disambiguate words by definition and/or context. Thus, if the video transcript mentions the word "buddy" the entity extraction may use the extraction rules to determine that the word "buddy" refers to a character's name in the video instead of a friend.

In addition, video transcript component 32 may generate a video transcript markup file 58 with time markers 60 associated with the one or more extracted entities 56. The time markers may delineate each block of closed captioning text to appear with the video image at the time marker corresponding to the extracted entities (e.g., when the words describing the entities are spoken). In addition, the video transcript file may also include metadata labels associated with the entities identifying how the entity is classified. For example, the video transcript file may indicate that New York is a location. In an aspect, the video text transcript file may be a XML or JSON file.

Referring back to FIG. 1, server 106 may also include related content engine 36 which is operable to determine related content 16 to video 14. For example, related content engine 36 may receive the video transcript markup file 58 from video transcript component 32. Related content may include, but is not limited to, content that is determined to have a relationship with the video, including, but not limited to, games, activities, books, maps, social media applications, weather applications, shopping applications, advertisements, promotions, news, recipes, and articles, among other forms of content. Relationships may be based upon various data sources, such as, genre data, location data, metadata entered by a content producer (e.g., title, keywords, network information, accounts associated with the content, date information), downloads/streams initiated by others, downloads/streams initiated by the user, a browsing history of a user, and social network data, among other data and/or metadata sources By using various data sources to determine the related content, aligned in time, for example, by using the video transcript markup file 58 as the master, the determined related content may include a diverse group of content.

Figure 3:
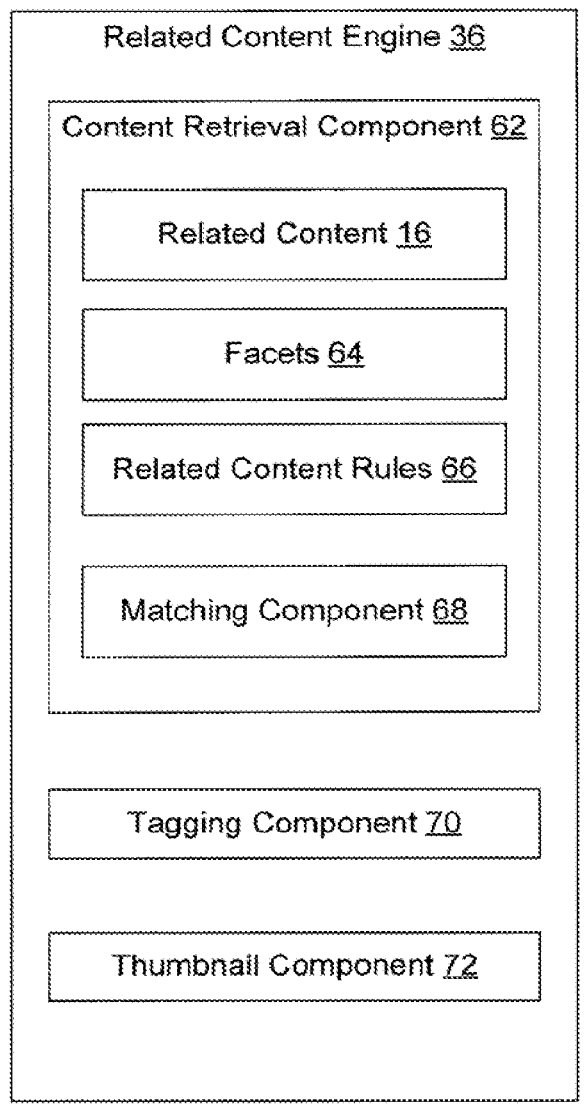
FIG. 3 is an illustration of an example related content engine operable within the connectivity system in accordance with another aspect of the present invention.

Referring now to FIG. 3, related content engine 36 may include a content retrieval component 62 operable to retrieve related content 16 from one or more content data repositories 48. The content data repositories may be owned by the same content provider of the video, third party public feeds (e.g., social media accounts, websites, maps, etc.), and/or partner or sponsored data repositories. In addition, content retrieval component 62 may also retrieve facets 64 from the related content 16. Facets may correspond to properties of the source for the related content and may include pre-existing fields in a data repository, such as a classification, description, or format. For example, content retrieval component 62 may retrieve specific facet types (e.g. biography) from an article data repository using extraction rules 50. Once the entity and corresponding facets are extracted using natural language processing (NLP) techniques and extraction rules 50, the system may retrieve related content items from relevant related content repositories. Thus, by using faceted classification, pre-defined extraction rules and NLP techniques, the transcribed text may be used to retrieve content from relevant related content repositories rather than retrieving related content from all available content repositories or using words from the transcript without additional processing.

Content retrieval component 62 may also include related content rules component 66 that may be used to identify which related content 16 to retrieve and from which related content sources the related content 16 should be retrieved. In an aspect, related content rules component 66 may apply one or more rankings and/or quality standards to potential related content. For example, related content rules component 66 may apply a hierarchy to content providers that may supply related content 16. Related content rules component 66 may instruct the content retrieval component 62 to retrieve related content 16 from a specific content providers first, and if the related content 16 is not available from the specific content provider, to retrieve the related content 16 from a content provider with the next highest ranking. In addition, related content rules component 66 may apply a set of quality standards criteria to determine whether or not related content 16 should be retrieved. Quality standards criteria may include, but are not limited to, images with a specified size and/or resolution, word count limits, and/or text containing specific information (e.g., directions, preparation times, and/or ingredients), among other quality standards. For example, related content rules component 66 may only include related content 16 for retrieval if the selected related content includes images of a certain resolution. If the selected related content does not include the images of certain resolution, the related content rules component 66 may determine that the selected related content does not meet the quality standards and may instruct content retrieval component 62 to select different related content 16 from the content data repositories for video 14.

The related content retrieval rules may increase the likelihood of a relevant match and/or a higher quality match between the related content and the selected video. In addition, the related content rules may reduce the processing time to determine related content to the video.

Content retrieval component 62 may also include matching component 68 operable to match related content 16 to the extracted entities of video 14. For example, a recipe article for making a pie which has been categorized as a recipe facet may be matched to a paragraph of text from the video transcript about baking a pie. Because the word pie appears in the video transcript with the word baking, the entity extraction component 54 can determine that the video transcript is talking about food instead of a pie chart, for example. The matching component 68 may match the entities extracted from video 14 with the recipe article based on the facet of the article and the subject matter of the article.

Related content engine 36 may also include a tagging component 70 operable to manually tag related content 16 with meta-data referencing related content 16. For example, the meta-data may summarize and categorize the related content 16.

In addition, related content engine 36 may include a thumbnail component 72 operable to create a dynamic thumbnail from images within the related content. Dynamic thumbnails may include, for example, images created from the related content (e.g., a screen grab from a video and/or an image within the source content). The images included in the dynamic thumbnails may be a thumbnail sized image created from a related content article's original sized image and/or from a screen grab of a video. In addition, dynamic thumbnails may also include excerpts from the related content that provide an overview of the related content. In an aspect, the dynamic thumbnails may be included in menu lists or preview bubble to allow users to preview the related content before selecting to view the related content.

Figure 4:
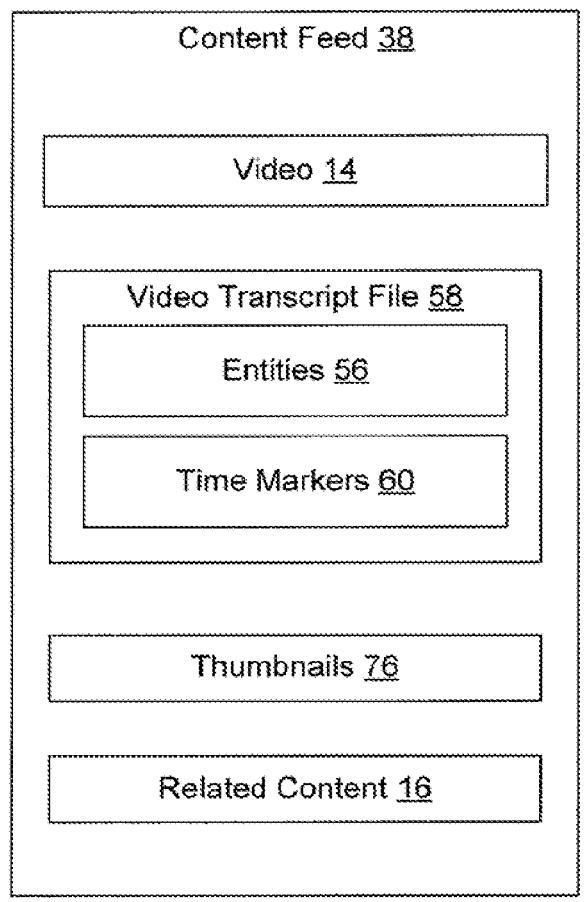
FIG. 4 is an illustration of an example content feed in accordance with an aspect of the present invention.

Related content engine 36 may further include a content feed component 74 operable to generate a content feed 38 including video 14, related content 16, thumbnails 76, and video transcript markup file 58, as illustrated, for example in FIG. 4.

Referring back to FIG. 1, server 106 may additionally include a content delivery manager component 40 operable to interface with related content engine 36 and deliver content feed 42 to digital device 102.

Digital device 102 may include display component 17 operable to receive content feed 42 from content delivery manager component 40. Display component 17 may also include interface display 20 operable to present content feed 42 to a user of digital device 102. Example interface displays 20 are illustrated in FIGS. 9A-9M).

Digital device 102 may also include a navigation component 22 operable to navigate between the playing video 14 and various related content 16 displayed contemporaneously with video 14.

Digital device 102 may also include a sharing component 28 operable to share an experience related to the user's interaction with interface display 20. For example, sharing component 28 may share a recording of the video a user viewed and the related content presented to the user. In an aspect, a browsing history data store may maintain a recording of which related content the user selected to view in more detail while the video was playing. In an aspect, the user may use the sharing component 28 to share the recorded experience, e.g., video and related content, with other individuals who may receive a recording of the same video experience that the user selected to view and/or interact with content. It should be noted that the browsing history data store may have multiple recorded experiences for a user, and therefore, a user may have an option to select one or more recorded experiences to share with other individuals. For example, the user may share the video viewing experience via social media accounts so that other users may follow the same experiences, such as viewing the video and the related content that the user selected to view.

Sharing component 28 may further include a quote component 29 configured to grab a quote from the playing video and/or grab a portion of the playing video to share with other individuals. In an aspect, quote component 29 may allow a user to select a portion of the transcript for the video currently playing and share the quote from the selected text. The quote component 29 may allow the user to select a portion of the video transcript, for example, for the previous 10 seconds, to include with the selected quote to put the quote in context of the video. Thus, the user may have the option to select just the quote and/or select additional text surrounding the quote in order to provide additional context for the quote.

In addition to sharing the quote, quote component 29 may share the portions of the video that mention the quote. For example, a link to the video segment corresponding to the quote grabbed may be shared along with the quote. The link to the video segment may be queued to the point in the video where the grabbed quote is located. Thus, when a user clicks on the video link, the user may access the location of the video where the quote occurred without having to watch the entire video segment.

In an aspect, quote component 29 may also allow a user to customize which time segments of the playing video to grab. For example, the experience provider may preset quotes that the content provider may want a user to share with other individuals. In another example, the user may select a start time segment, e.g., 2:10, of the video playing and an end time segment, e.g., 2:25 seconds, of the playing video. The quote component 29 may grab a copy of the video between 2:10 seconds and 2:25 seconds and allow the user to share the grabbed video. In an aspect, a user may grab a quote from the video transcript and/or a portion of the playing video using the quote component 29, and share the selected quote and/or video via the user's social media accounts.

Digital device 102 may also include a feedback component 24 operable to receive feedback 26 from a user of digital device 102. Feedback may include, for example, reviewing and/or rating content, providing comments on content, sharing content with other users, and selecting content to view and/or access, among other forms of feedback the user may provide regarding the related content.

Feedback component 24 may transmit the feedback 26 to optimization component 44 on server 106. Optimization component 44 may receive feedback 26 from feedback component 24 and apply one or more analytics to measure the interaction with each piece of related content 16 based upon the feedback 26 associated with related content 16. The analytics may monitor specific terms, categories, timeline proximity, and frequency of interactions with the related content to determine which related content 16 produces the best engagement metrics. For example, if related content associated with one character receives more user views than related content associated with another character, optimization component 44 may provide a revised content feed 45 with related content associated with the character that receives more user views than the other character.

Additionally, the analytics may determine that particular types of related content may be more frequently viewed than other types of related content. For example, if the analytics determine that actor biographies are read for longer time periods than information about places, optimization component 44 may increase the number of actor biographies associated with the video. The analytics may also determine whether content that is a certain time period away from the previous content is viewed more or less, and optimization component 44 may adjust the component based upon the determination. For example, if the content is spaced too closely together and the content is not viewed, optimization component 44 may increase the time period between the content. The analytics may further determine whether the total amount of related content presented with the video is appropriate. For example, optimization component 44 increase and/or decrease the total amount of related content presented with the video. Thus, the optimization process may also smooth out the video viewing experience and update the rules used to determine the related content.

In an aspect, the optimization process may personalize the viewing experience for a user by changing the related content presented to the user based upon the user's previous viewing behavior. For example, if the user typically selected to play games instead of viewing recipes, the related content may present more games associated with the video instead of recipes. Thus, the relevancy of the content presented over time may improve as the system learns the user's preferences through, for example, the received user feedback (e.g., information provided by the user) and/or usage behaviors of the user (e.g., content the user selects to view and/or content that the user selects not to view). In addition, the relevancy of content presented may be based upon content other users select to view. For example, if a video clip is viewed by 100 users and majority of the users select the same article to read, the system may infer that the article is related to the video based upon the behavior of other users who viewed the same video. Therefore, the more the user interacts with the system, the more personalized the viewing experience may become for the user.

Figure 5:
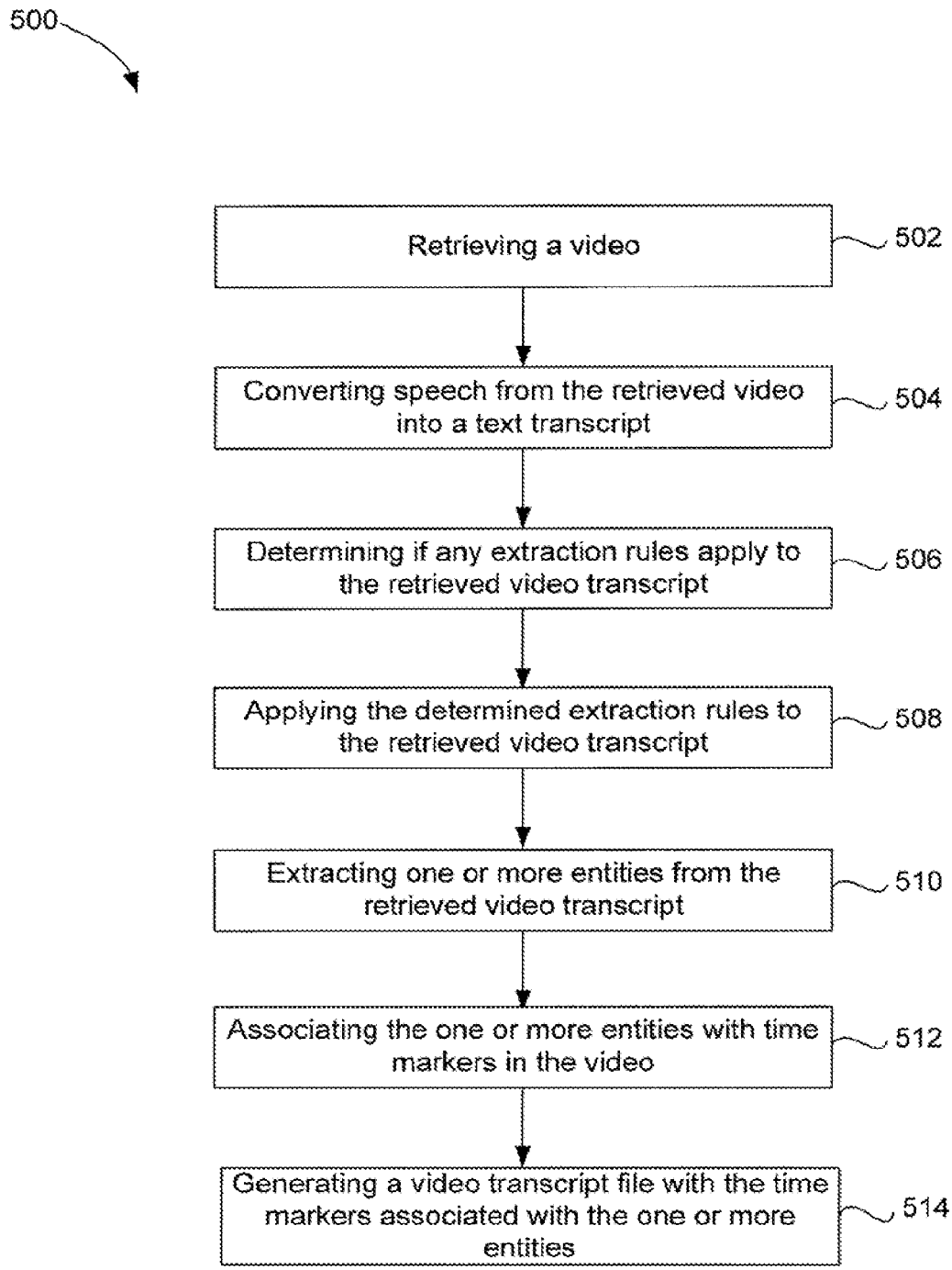
FIG. 5 is an illustration of an example method flow for creating a video transcript in accordance with an aspect of the present invention.

Referring now to FIG. 5, illustrated therein is a method 500 for creating a video transcript in accordance with an aspect of the present invention. The method may include retrieving a video 502. For example, receiving component 30 (FIG. 1) on server 106 (FIG. 1) may retrieve the identified video from a data repository of videos.

The method may also include converting speech from the retrieved video into a text transcript 504. For example, conversion component 52 (FIG. 2) may use speech to text technology to convert the audio of the spoken words in the video into a text transcript of the video. In another aspect, the video text transcripts may be retrieved from a data repository of video transcripts.

The method may also include determining if any extraction rules apply to the retrieved video transcript 506. Extraction rules may include, but are not limited to, rules regarding the transcription of the selected video. For example, extraction rules may identify specific character names in the video, locations in the video (e.g., geographical locations, restaurants, stores, shopping centers, cafes, etc.), and social media accounts associated with the characters in the video (e.g., hashtags, account information, etc.) and determine how the identified information should be processed.

In addition, the method may include applying the determined extraction rules to the retrieved video transcript 508. In an aspect, extraction rules component 50 (FIG. 2) may determine if any extraction rules apply to the retrieved video transcript, and may apply the determined extraction rules to the words spoken in the retrieved video transcript. For example, when the identified words are spoken, e.g., a character's name, in the retrieved video, the extraction rules may determine that the character's social media account should be associated with the character's name.

The method may further include extracting one or more entities from the retrieved video transcript 510. In an aspect, entity extraction component 54 (FIG. 2) may identify and classify specific terms in the text transcript of the video. For example, the identified terms in the video may be categorized into entities by using natural language processing which may use meta-data lists to more precisely process and categorize the identified terms into entities and may improve the entity extraction process. For example, if the text transcript referenced a character's bakery in the video, entity extraction component may extract the character's bakery from the text transcript and classify the bakery as a "place" entity. In addition, by using natural language processing, the character's bakery may also be identified as the place where the character works. Thus, using natural language processing and extraction rules may improve the matching process between the transcribed text and the entities extracted from the transcribed text.

In addition, the method may additionally include associating the one or more entities with time markers in the video 512. The time markers may delineate each block of closed captioning text to appear with the video image at the time the corresponding to the extracted entities (e.g., when the words describing the entities are spoken).

The method may also include generating a video transcript file with the time markers associated with the one or more entities 514. For example, video transcript component 32 may generate a transcript file that may contain a text transcript of the video and time markers associated with the one or more entities. This video transcript file may be used to match entities in the video with related content aligned to the time markers in the video. In an aspect, the video transcript file may be a XML or JSON file.

Figure 6:
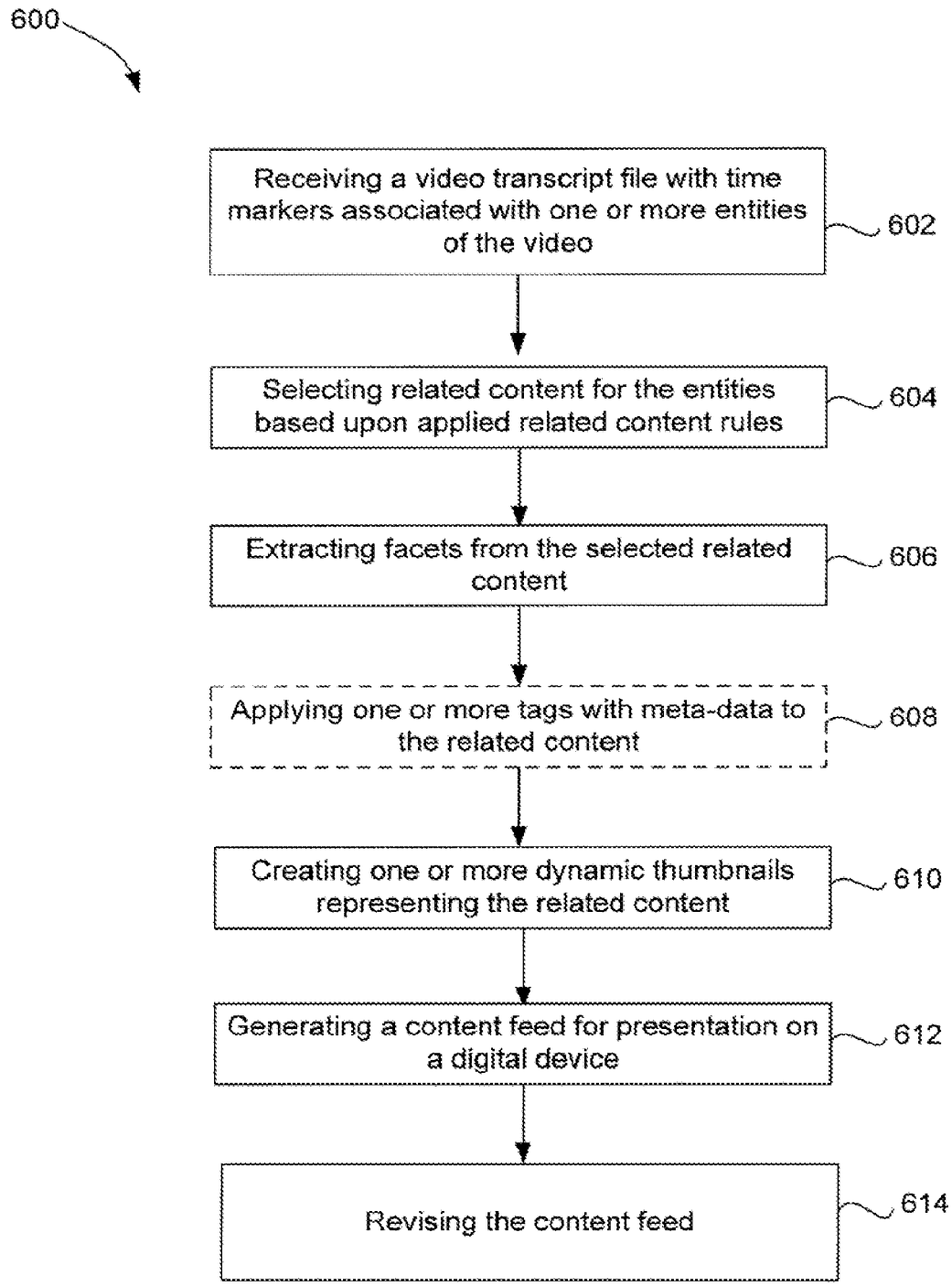
FIG. 6 is an illustration of an example method flow for determining related content to the video in accordance with an aspect of the present invention.

Referring now to FIG. 6, illustrated therein is a method 600 for determining related content to the video in accordance with an aspect of the present invention. Related content may include content that is determined to have a relationship with the video. Relationships may be based upon various data sources, such as, genre data, location data, metadata inserted by a content producer, downloads performed by others, downloads performed by the user, the user's browsing history, and social network data, among other data sources. Related content may include, but is not limited to, games, activities, books, social media applications, weather applications, shopping applications, advertisements, promotions, news, recipes, and articles, among other forms of content.

The method may include receiving a video transcript file with time markers associated with one or more entities of the video 602. For example, related content engine 36 may receive the video transcript file that may contain a text transcript of the video and time markers associated with one or more entities from the video.

The method may further include selecting related content for the entities based upon applied related content rules 604 and time-aligning the related content selections with the video. Related content engine 36 (FIG. 3) may use, for example, related content rules component 66 for determining relationships between the content and the extracted entities from the video. In an aspect, related content rules component 66 may use the extracted entities from the video as a dynamic search query for dynamically determining which content in a data repository may be related to the video. In addition, the related content rules component 66 may use elements of the video in combination with other data sources (e.g., location, genre data, metadata, etc.) for dynamically determining related content for the entities. By using related content rules, the processing time for determining which related content to use may be reduced and the relevance of the related content that is retrieved may be increased.

For example, searching for related content may be performed based upon keywords from the text transcript. When keywords from the text transcript match the content, the content may be selected as being related to the video. For example, if the video transcript includes "Alaskan King Crabs" the server may select an article on fishing injuries related to Alaskan King Crabs as being related to the video.

It should be noted that a variety of searching methods may be used in combination with and/or in addition to keyword searching. For example, the searching may infer the meaning of content by using techniques, such as Bayesian pattern matching techniques and selecting content based upon the inferred meaning. In addition, the searching may disambiguate the search queries terms and remove content that may not be relevant to the search query In addition, the method may include extracting facets from the selected related content 606. For example, related content engine 36 may extract one or more facets from the related content data repositories. In an aspect, related content rules component 66 may apply one or more content rules that define relationships between the entities and the facets and may determine related content items for the entities based upon the defined relationships between the entities and the facets. In addition, content retrieval component 62 may retrieve the determined related content items from one or more content data repositories.

Optionally, the method may include applying one or more tags to manually insert meta-data to the related content 608. For example, tagging component 70 (FIG. 3) may tag the related content with meta-data describing the related content. For example, the meta-data may summarize and categorize the related content.

The method may further include creating one or more dynamic thumbnails representing the related content 610. Dynamic thumbnails may include, for example, images created from the related content (e.g., a screen grab from a video and/or an image within the source content). For example, the images included in the dynamic thumbnails may be a thumbnail sized image created from a related content article's original sized image and/or from a screen grab of a video. In addition, dynamic thumbnails may also include excerpts from the related content that provide an overview of the related content. In an aspect, the dynamic thumbnails may be included in menu lists to allow users to preview the related content before selecting to view the related content.

The method may also include generating a content feed for presentation on a digital device 612. For example, the content feed may include the transcript file, the dynamic thumbnails and the related content.

The method may optionally include revising the content feed 614. In an aspect, the system may revise the content feed based upon feedback received from users of the system. For example, the system may receive feedback from users viewing the videos and related content. The received feedback may signal whether the user is interested and/or not interested in the presented content. For example, a user of the digital device may review and/or rate the content, provide comments on the content, share the content with other users, select content to view and/or access, select not to view and/or access content, and purchase a promotion, among other forms of feedback. The system may apply one or more analytics to measure the interaction with each piece of related content based upon the received feedback associated with the related content and may determine which related content produces the best engagement metrics. The system may revise the content feed based upon the received feedback.

In an aspect, the content feed may be reviewed and/or revised by a content producer. The content producer may view the video with the closed captioning and related content to approve, modify, add or delete related content matches. The content producer can manually apply similar content rules to optimize the related content associated with the video. The content producer may also apply other resources, such as an editorial calendar or current events, to ensure the related content corresponds to events that are currently taking place.

Figures 7A, 7B:
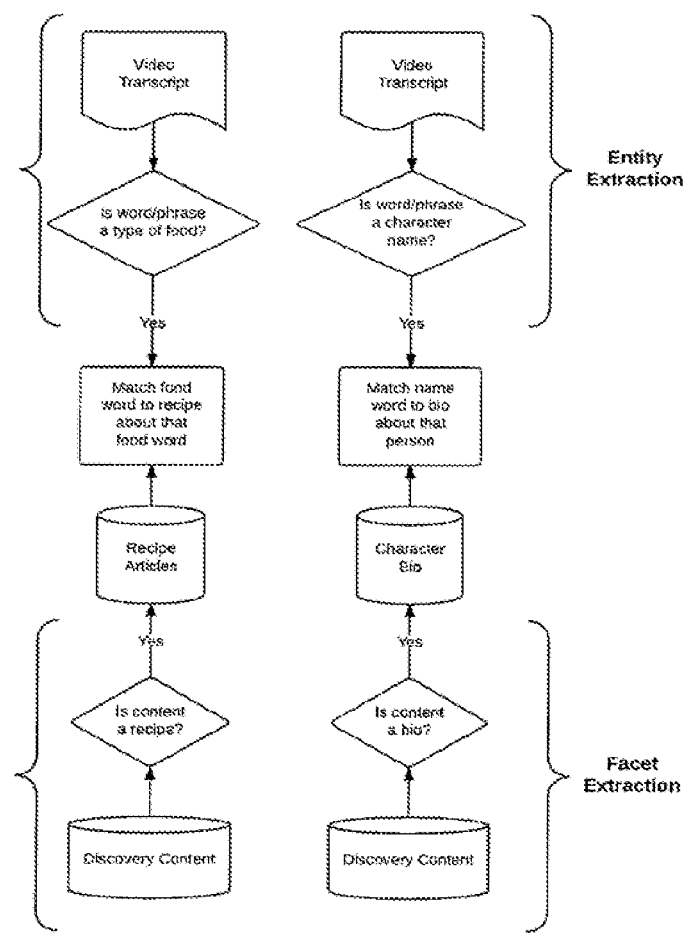
FIGS. 7A and 7B present illustrations of an example method flows for entity extractions and facet extractions in accordance with an aspect of the present invention.

Referring now to FIGS. 7A and 7B, illustrated therein are example method flows for entity extractions and facet extractions in accordance with an aspect of the present invention. FIG. 7A illustrates an example method that applies an entity extraction rule corresponding to determining whether the word and/or phrase from the video correspond to a type of food. In addition, the method includes an example facet extraction from a content data repository for content associated with food, such as recipe articles. The method also includes matching the food word to a recipe about the food word.

FIG. 7B illustrates an example method that applies an entity extraction rule corresponding to determining whether the word and/or phrase from the video correspond to a character name. The method also includes a biography facet extraction from the content data repository for content associated with a biography. The method further illustrates matching the extracted facets, e.g., biographies from the content data repository, with the extracted entity, e.g., character name, to match the character name with a biography of the character.

Figure 8:
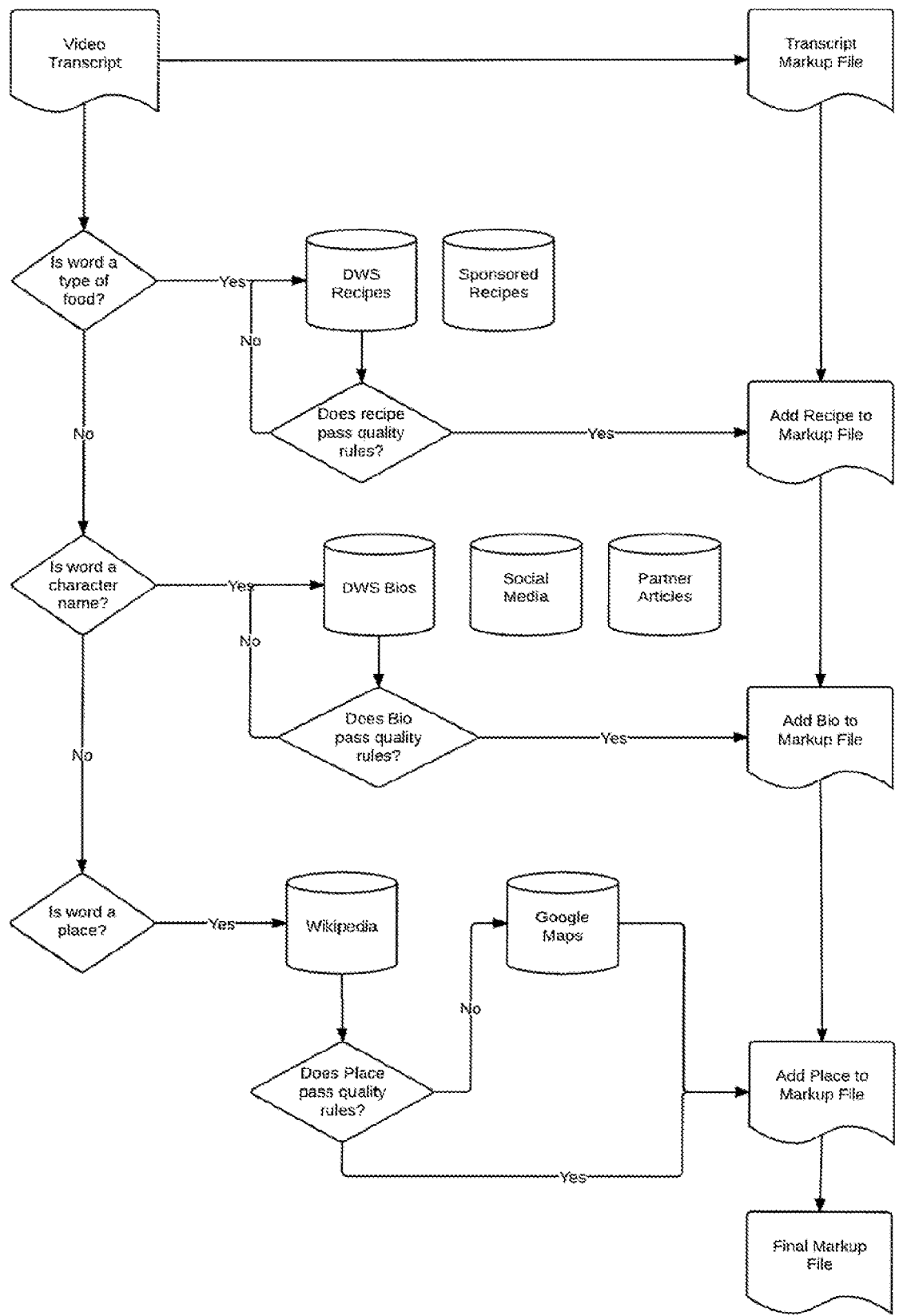
FIG. 8 is an illustration of an example method flow for determining related content for the video in accordance with an aspect of the present invention.

Referring now to FIG. 8, illustrated therein is an example method flow for determining related content for the video in accordance with an aspect of the present invention. The method may include determining whether the word in the video transcript is a type of food, a character name and/or a place. The method may further include extracting related content associated with the word from the video transcript and determining whether the extracted related content passes a quality standard. If the related content passes the quality standard, the method may further include adding the related content to the transcript file. If the related content does not pass the quality standard, the method may further include extracting a different type of related content for the word in the video transcript and determining whether the newly extracted related content passes the quality standard. Thus, it should be noted that method may repeat until the extracted content passes the related quality standards.

Figure 9A:
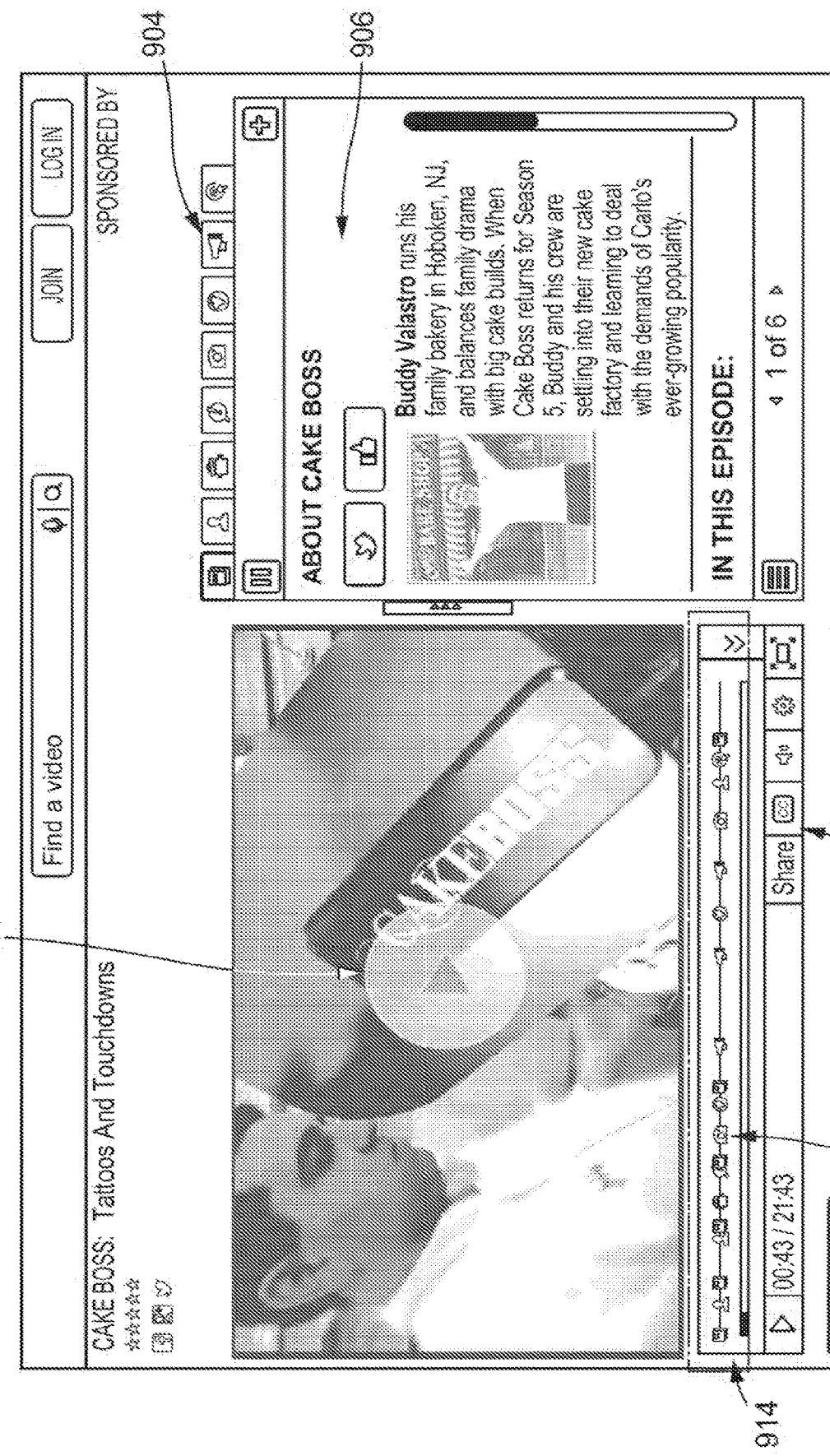

Referring now to FIGS. 9A-9M, illustrated therein are example graphical user interface (GUI) screens illustrating exemplary implementations of aspects of the present invention. FIG. 9A illustrates an example interface 900 in accordance with an aspect of the present invention. Interface 900 may include a video player interface 902 operable to play a selected video. Interface 900 may also include one or more related content tabs 904 corresponding to one or more related content. For example, each related content tabs 904 may represent a specific category of content, such as a recipe, a photo gallery, sponsored content, a game, an article, video clips, social media feeds, maps, and locations, among other categories of content. Thus, when a content tab is selected by a user, the related content associated with the selected tab may be presented. Interface 900 may also include a related content interface 906 where related content may be dynamically presented concurrently while the video is playing in video player interface 902.

Interface 900 may also include an interactive timeline 914 with corresponding timeline icons 912. The interactive timeline icons may include graphical representations corresponding to the type and/or category of the related content associated with the interactive timeline icons. Timeline icons 912 may also control the presence of related content icons on interactive timeline 914. In addition, when the timeline icons 912 are selected, the corresponding related content may be presented in the related content interface 906.

Figure 9B:
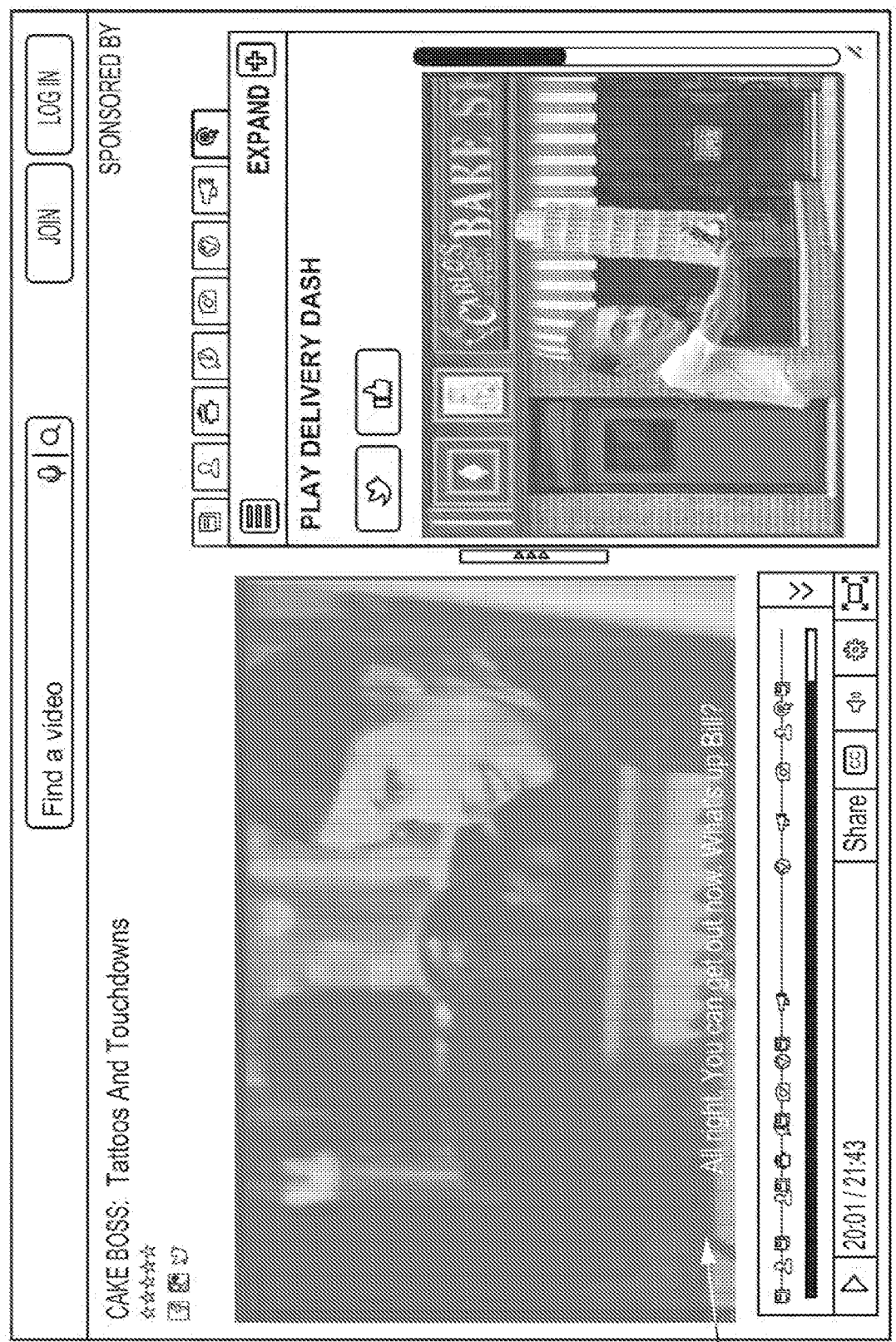

Interface 900 may further include a closed captioning button 910. FIG. 9B illustrates closed captioning text presented on interface 900 along with the video playing in video player interface 902.

Figure 9C:
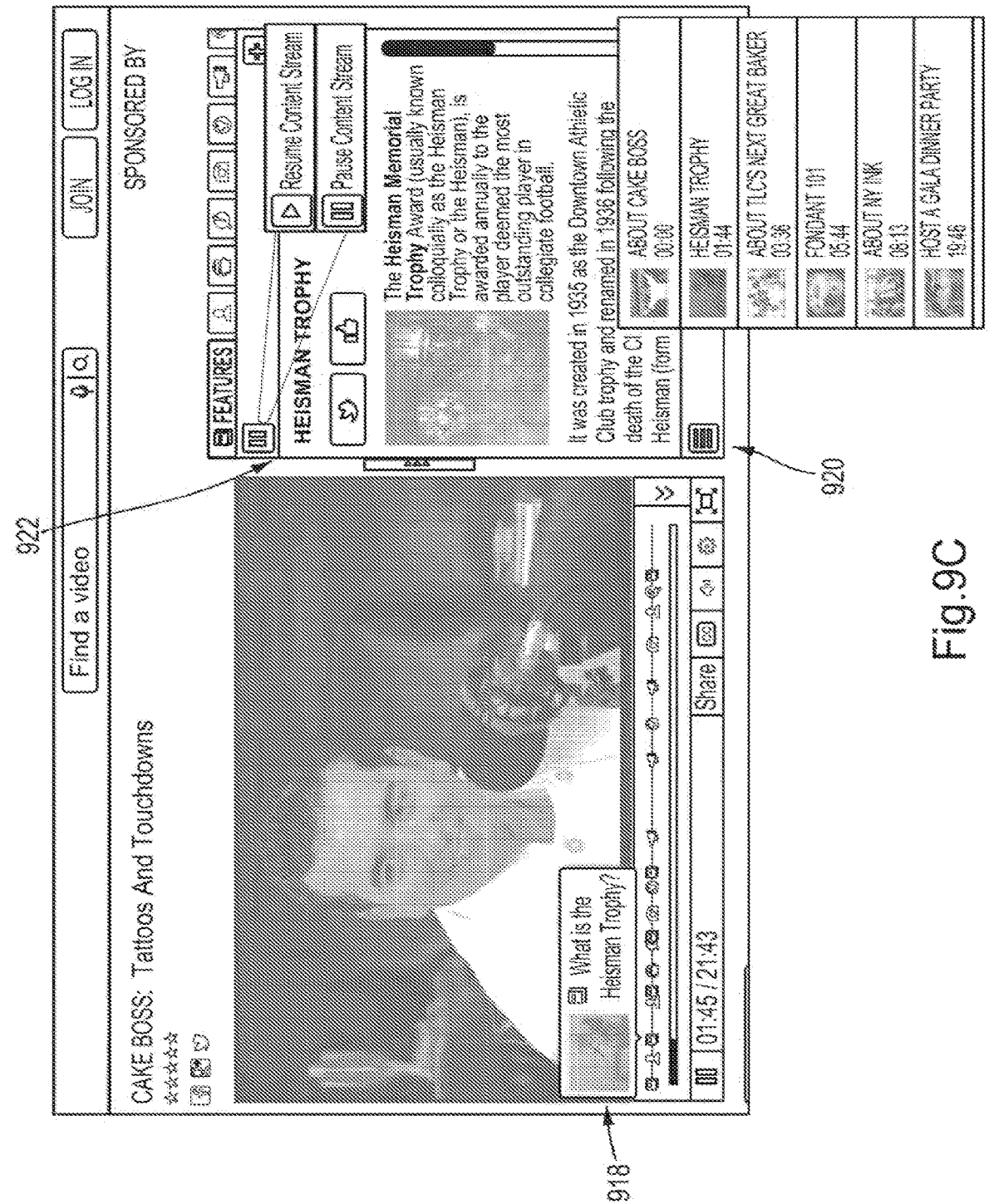

FIG. 9C illustrates a preview bubble 918 with a thumbnail image of related content that corresponds to timeline icons 912 (FIG. 9A). The preview bubble 918 alerts the user to related content that may be displayed and/or already displayed. Interface 900 may further include a content stream control button 922 that allows a user to resume and/or pause the content stream. The related content may automatically load in the related content interface 906 when events in the playing video correspond to the related content interface 906. In addition, the preview bubble 918 may also be synchronized and present the related content when the events in the playing video correspond to the related content. Thus, when the playing video reaches a related content item, the preview bubble for the related content may appear over the interactive timeline and/or over the video. By turning the content stream control button 922 to "off", the related content does not load until either the user selects "on" or "resume", or clicks on a related content tab or icon on the interactive timeline. Interface 900 may also include a list all available content button 920. By selecting the list all available content button 920, interface 900 may present a list of all the available content associated with the playing video capable of being presented in the related content interface 906. The user may select a variety of related content from the list and have the selected related content be presented in the related content interface 906 and/or the video move to the time marker associated with the selected related content.

Figure 9D:
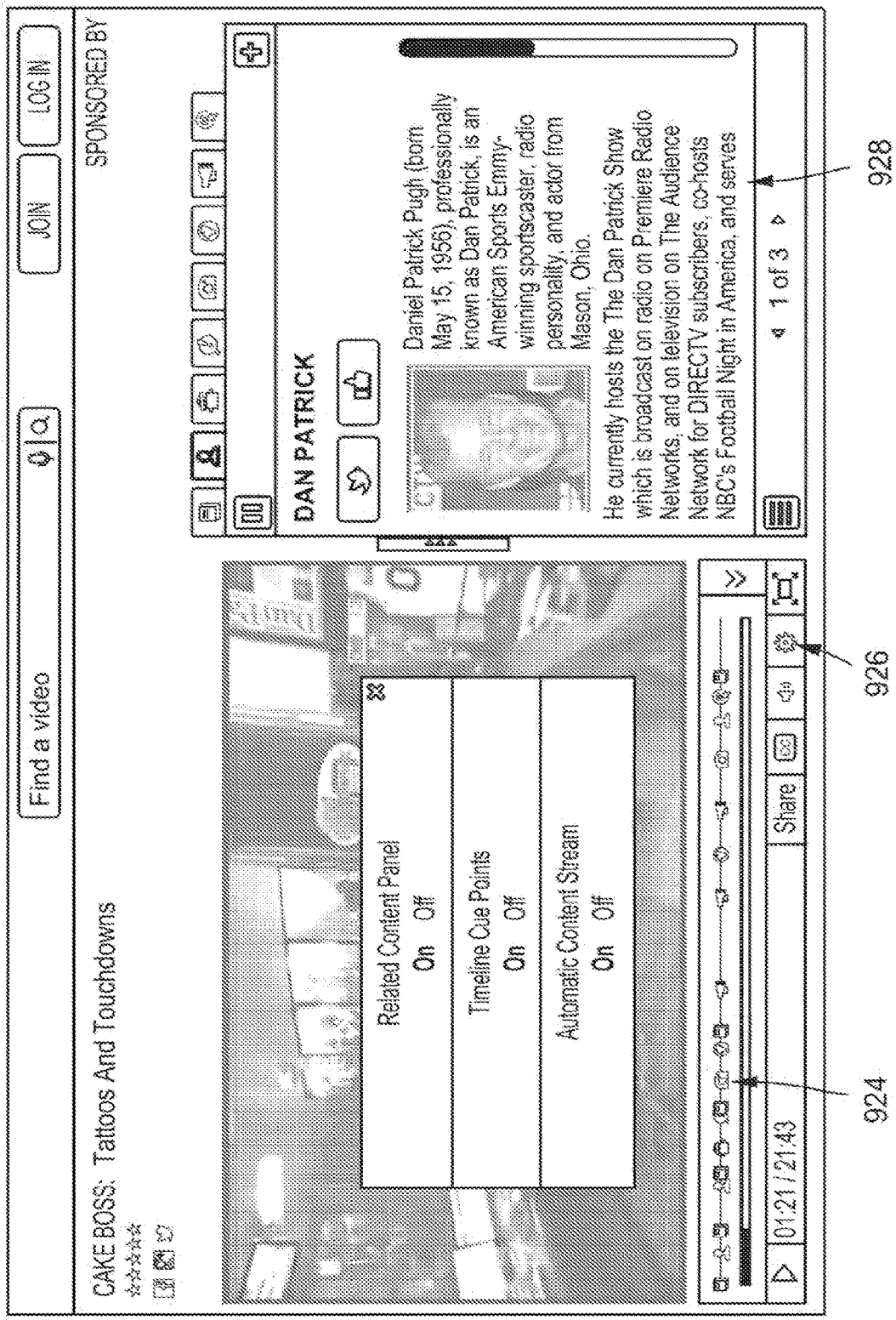

FIG. 9D illustrates a related content panel 928 displayed on interface 900. Interface 900 may include a related content stream setting 926 that may control the automatic load of the related content. For example, the related content may automatically load when synchronized with the preview bubble events overlaying the interactive video timeline or the related content may not load until the user selects "on" or "resume." In addition, interface 900 may include interactive timeline cue icons 924 that control the presence of related content icons on the interactive timeline 914.

Figure 9E:
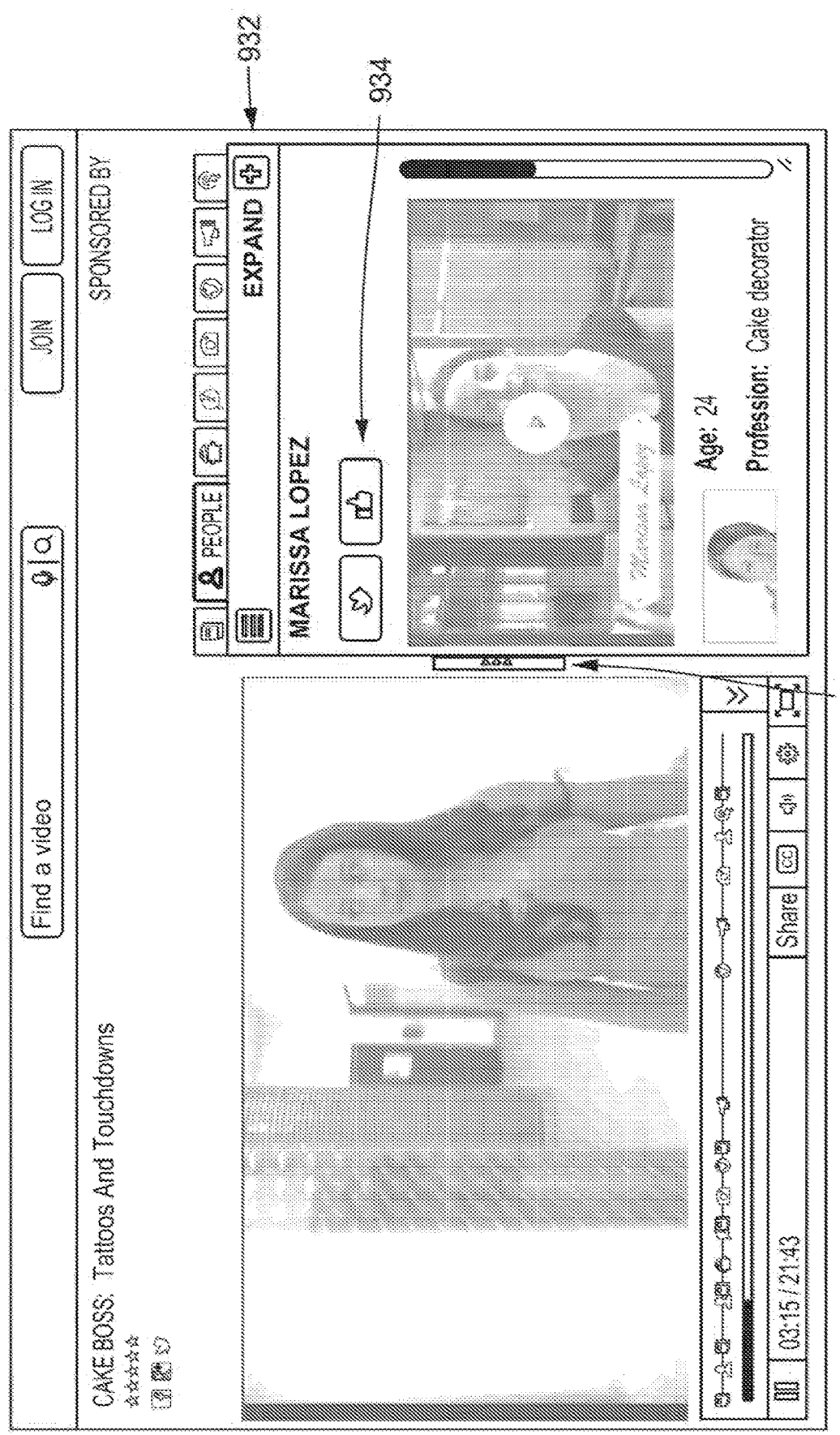
Figure 9F:
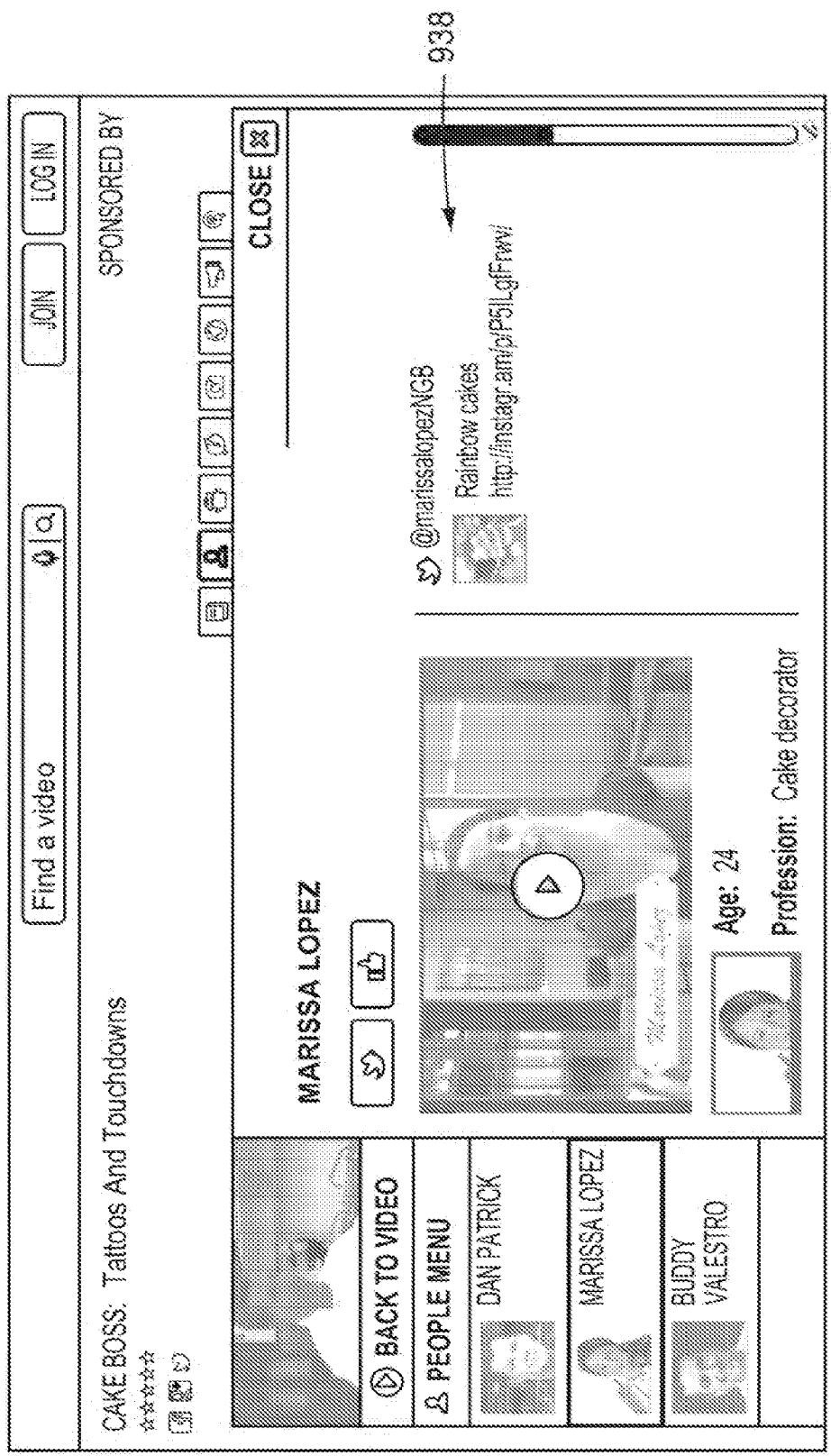

FIG. 9E illustrates an ability to hide related content interface 906 by selecting the button 930. By hiding the related content interface 906, the video player interface 902 may expand and cover most of interface 900. Interface 900 may also include a full expansion button 932 that may fully expand the related content interface 906. When a user selects the full expansion button 932, the video may pause and the related content interface may cover most of interface 900. Interface 900 may also provide a user an option to access one or more social media accounts by selecting social media button 934. In addition, interface 900 may provide real-time social media content 938, as illustrated in FIG. 9F. It should be noted that the user may access and/or interface with the one or more social media accounts while simultaneously viewing the video playing in video play module.

Figure 9G:

FIG. 9G illustrates an example extended interview and biography 940 of a character in the video playing in the video player interface 902. The user may pause the video while reviewing the extended interview and biography 940 of the character before resuming the video.

Figure 9H:
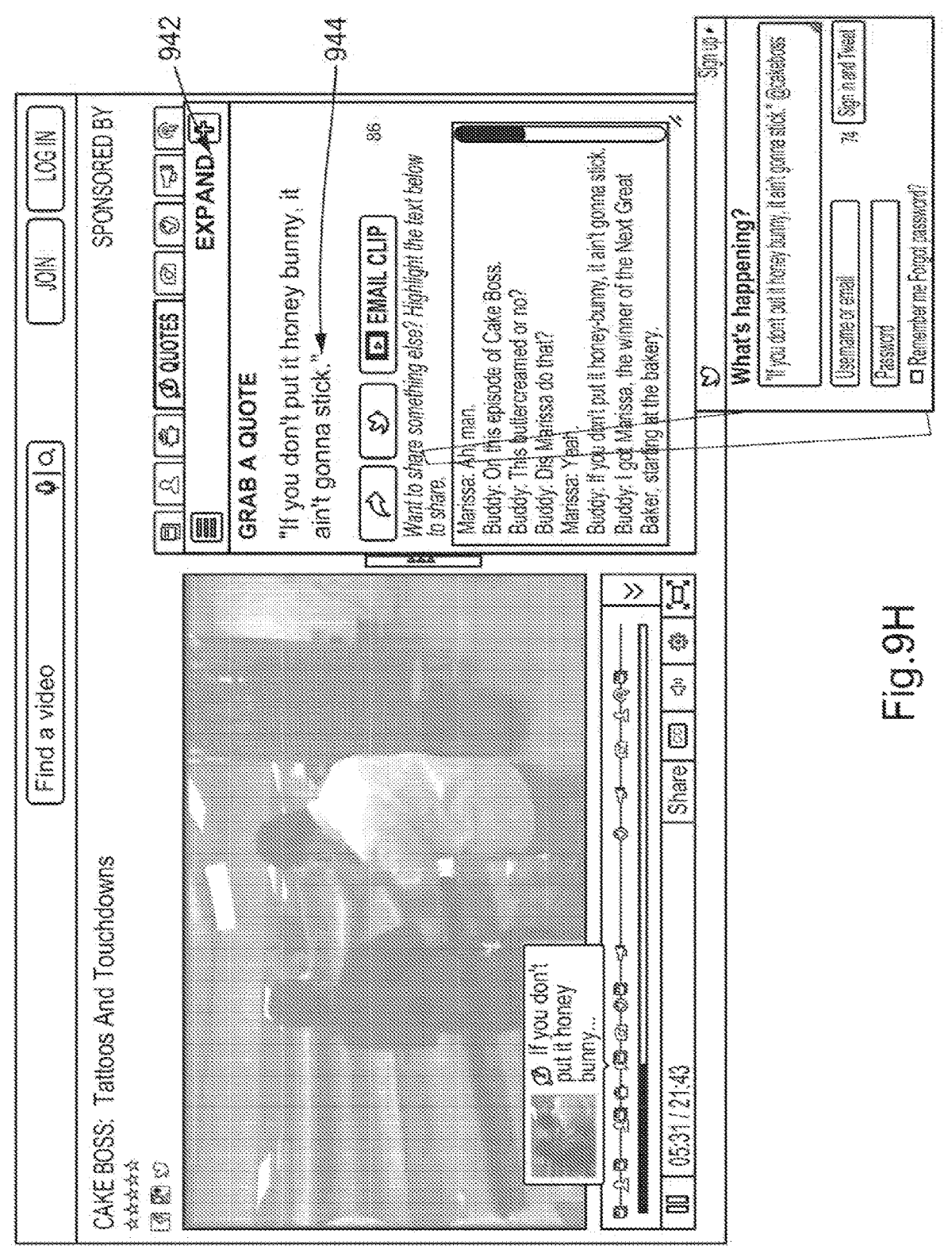

As illustrated in FIG. 9H, interface 900 may allow a user to grab a quote from the video playing in video player interface 902. The quote may be an editorial quote 942 where the content provider of the video pre-selects quotes from the video. In addition, a user may be able to highlight a section of the transcript to create a quote from the video to share with other individuals, as illustrated in 946 of FIG. 9I. By providing the text transcripts, users are able to share the exact quote from the video. Interface 900 may also allow a user to share the selected quote via one or more social media accounts 944. For example, the user may share the selected quote by importing the quote into a social media message (e.g., a Tweet or a Facebook message).

Figure 9I:
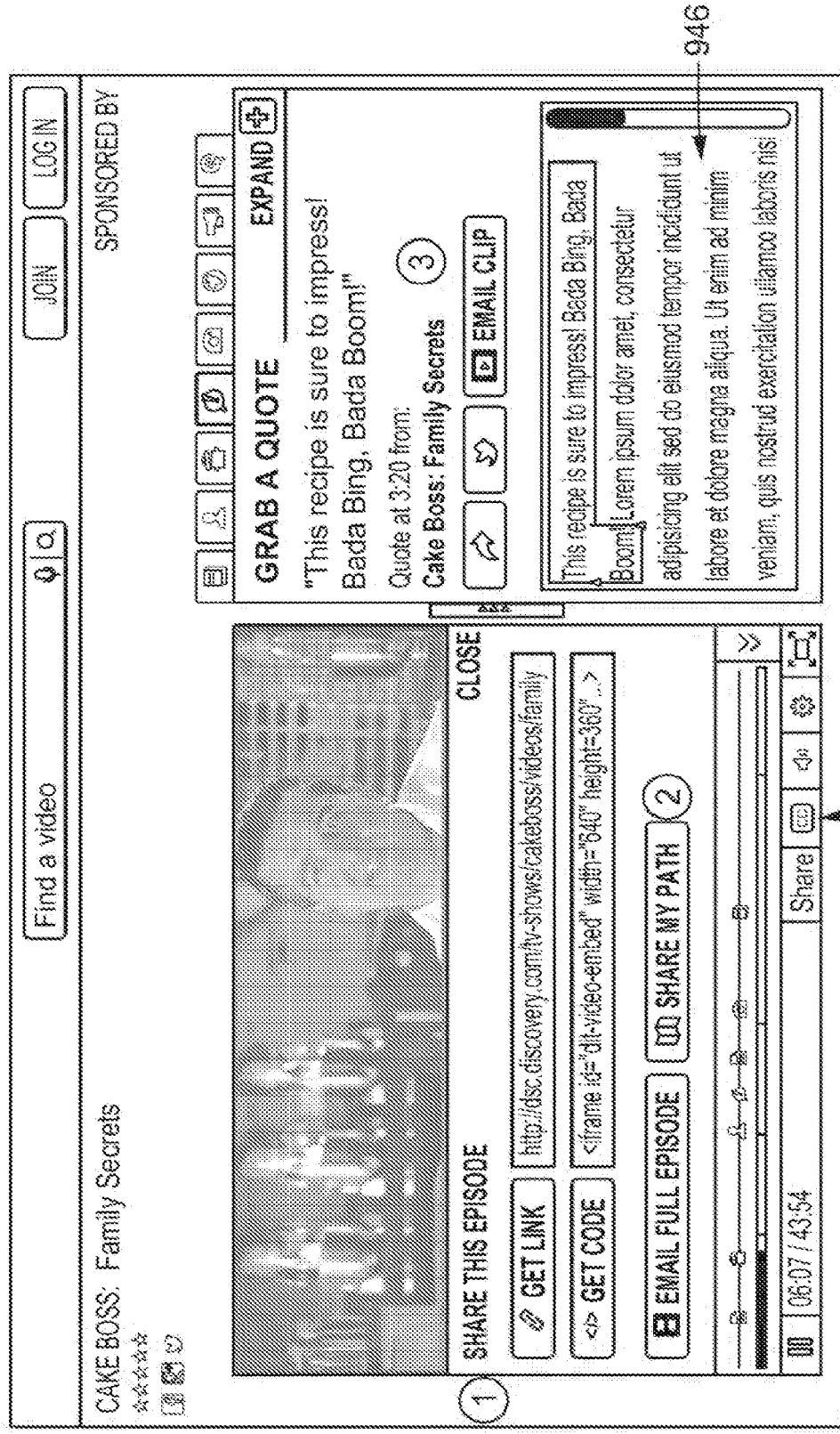

In addition, as illustrated in FIG. 9I, interface 900 may allow a user to share the selected quote along with a link to the specific moment in the video associated with the quote 945. A user may be able to select to email or embed a link to the beginning of a video to share an entire video with another user. The user may also select to share the video and related content elements viewed during the video session. Thus, another individual may be able to have the same video experience as the user sharing the video and related content.

Figure 9J:
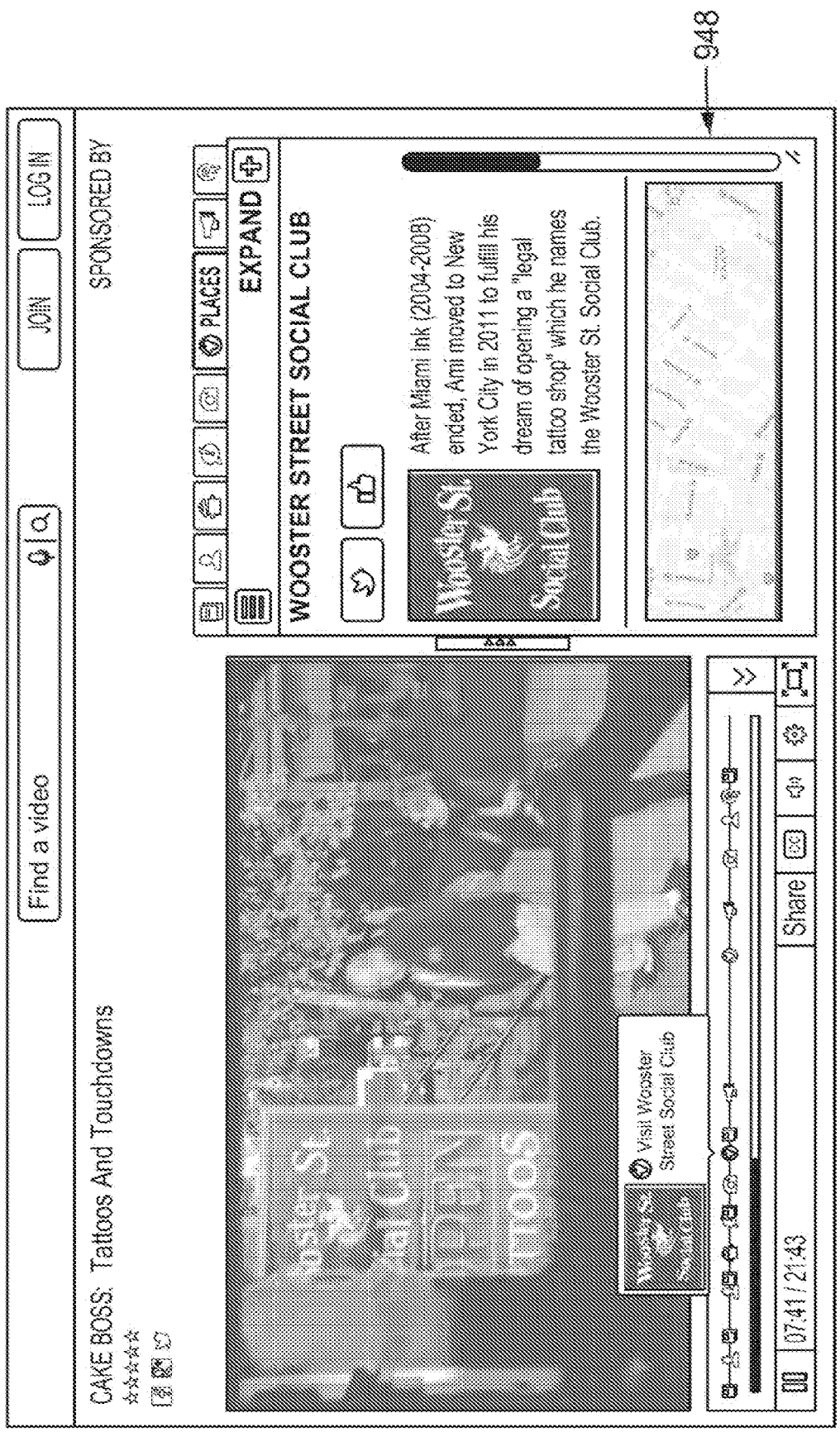

FIG. 9J illustrates an example map 948 related to a place mentioned in the video presented in the related content interface 906.

FIG. 9K illustrates an example promotion 950, such as an offer or discount for the related content presented in related content interface 906. In addition to promotions, sponsors may advertise in related content interface 906 to drive user awareness of the various products associated with the presented related content. For example, if the video playing is related to catching lobsters, interface 900 may present promotions 950 relating to seafood restaurants. In an aspect, the server may receive location information from the digital device via a location component, such as global positioning system (GPS), and use the received location information in providing targeted advertising to the user for places near the received digital device location. Another example may include presenting a coupon for purchasing canned tomatoes when the video being played is a video demonstrating cooking Italian food. Thus, the advertisements and/or promotions presented may be tailored and/or changed based upon the video that is currently being played in video player interface 902. Content providers may have content presented with integrated advertisements and/or promotions based upon the videos selected by users. In an aspect, a third party may broker relationships among content providers and advertisers.

Figure 9L:
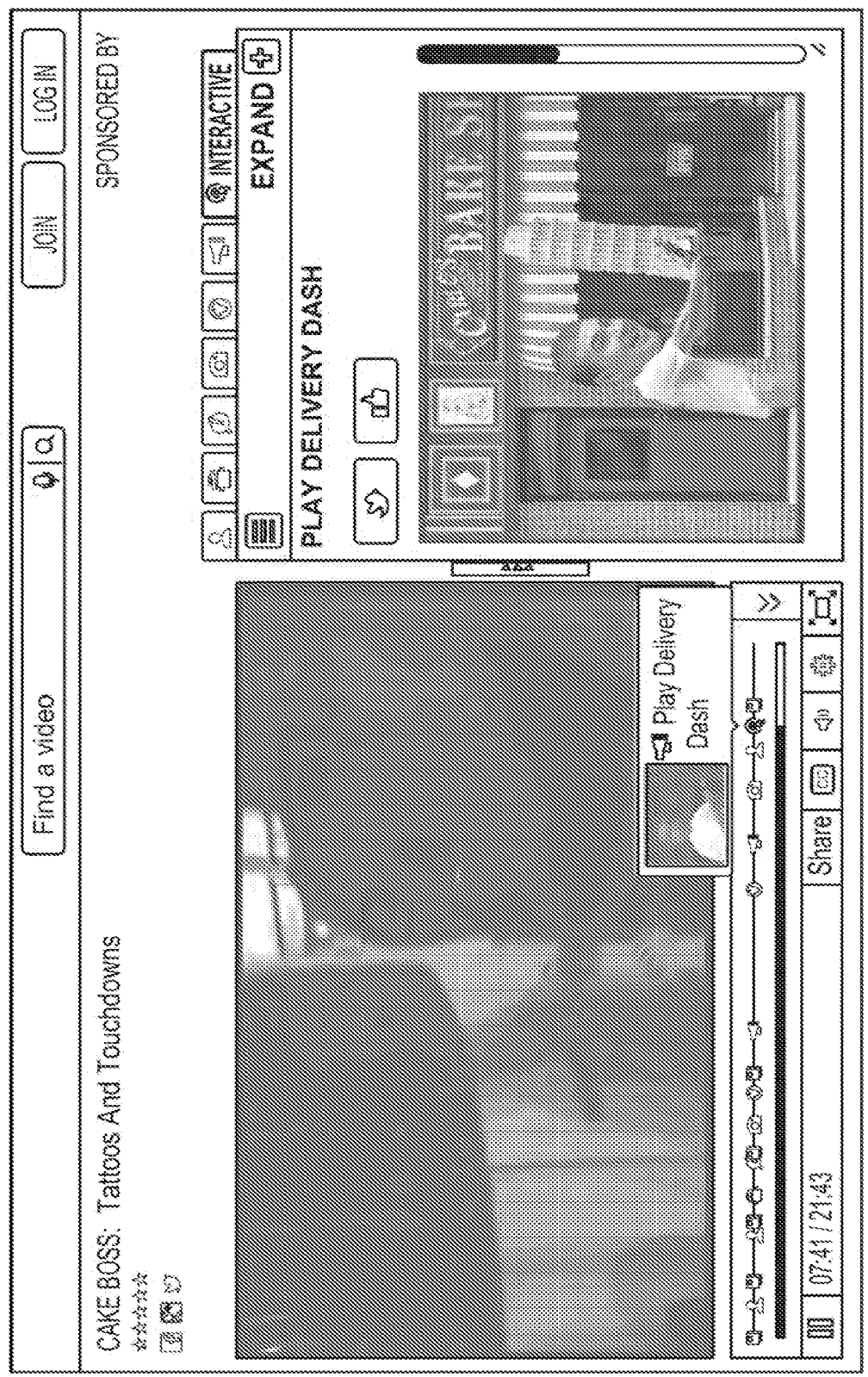

FIG. 9L illustrates an example interface 900 where a user may play a game in the related content interface 906 while the video continues to play in the video player interface 902. It should be noted that the games and other activities, such as such as puzzles and quizzes may be dynamically displayed to the user based on their determined relevance to the selected video.

Figure 9M:
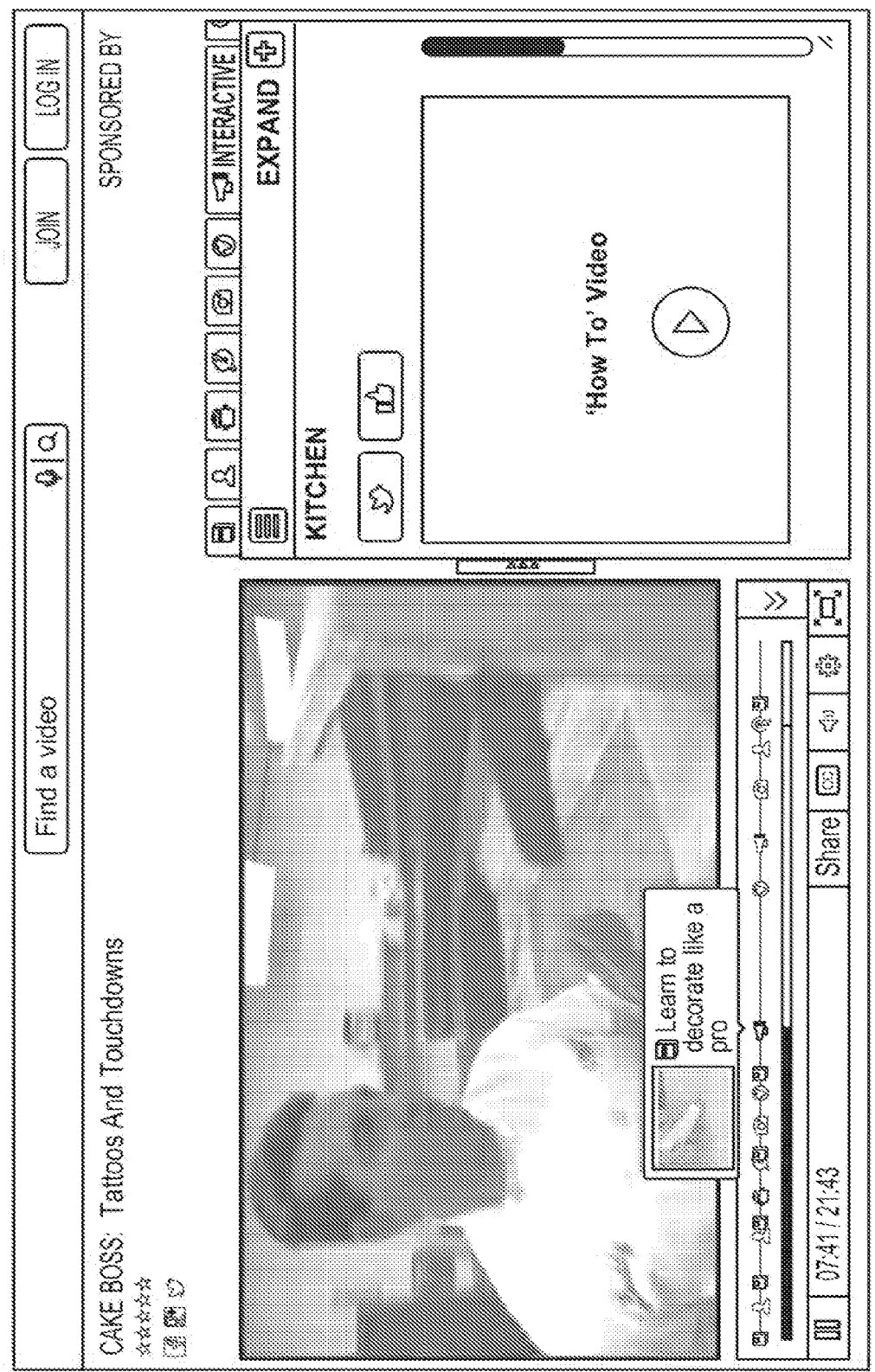

FIG. 9M illustrates an example interface 900 where a related video is available for viewing in related content interface 906 while simultaneously watching the main video in the video player interface 902.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Figure 10:
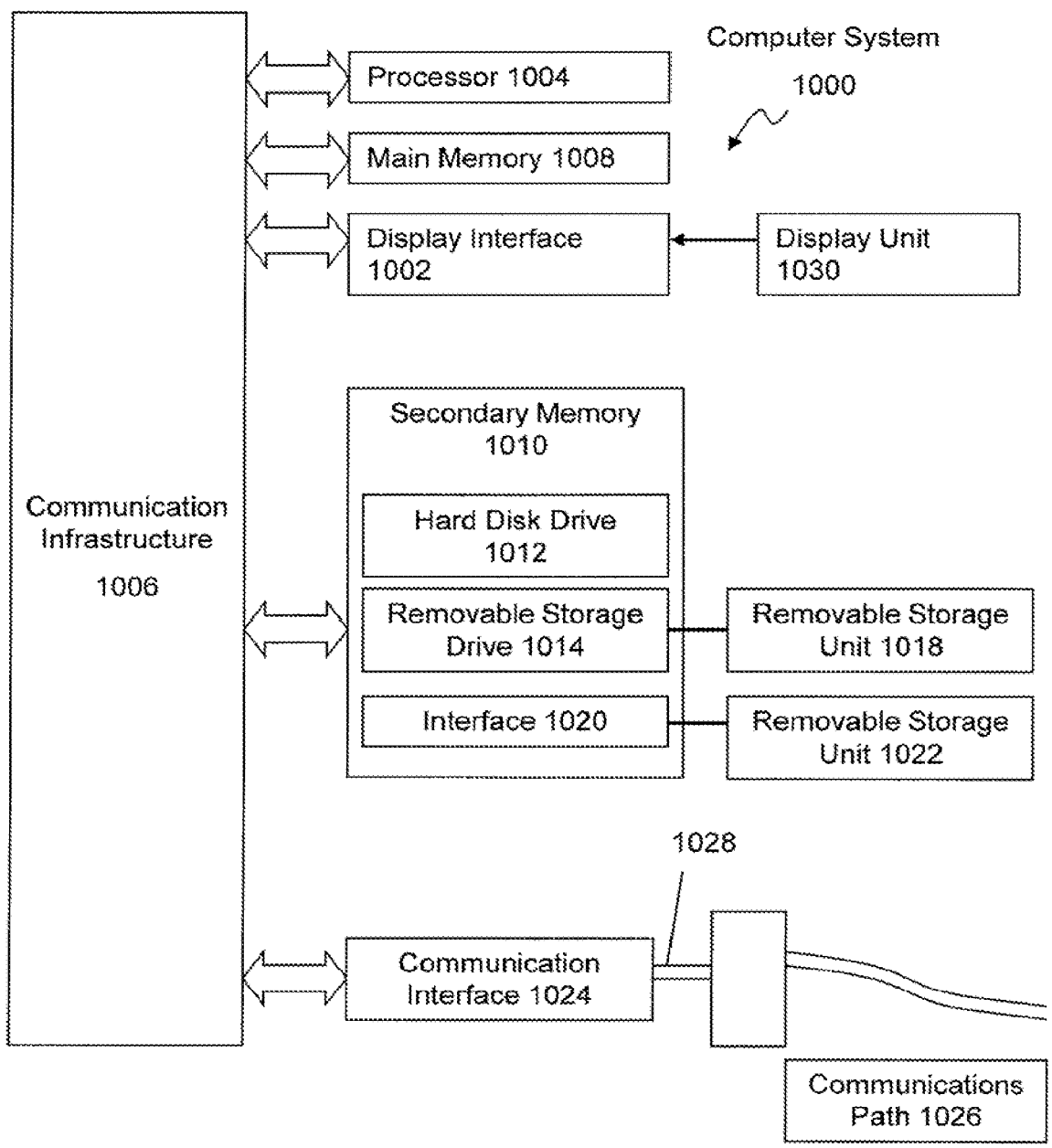
FIG. 10 illustrates various features of an example computer system for use in conjunction with aspects of the present invention.

Aspects of the present invention may be implemented using hardware, software, or a combination thereof and may be implemented in one or more computer systems or other processing systems. In an aspect of the present invention, features are directed toward one or more computer systems capable of carrying out the functionality described herein. An example of such a computer system 1000 is shown in FIG. 10.

Computer system 1000 includes one or more processors, such as processor 1004. The processor 1004 is connected to a communication infrastructure 1006 (e.g., a communications bus, cross-over bar, or network). Various software aspects are described in terms of this exemplary computer system. After reading this description, it will become apparent to a person skilled in the relevant art(s) how to implement aspects of the invention using other computer systems and/or architectures.

Computer system 1000 can include a display interface 1002 that forwards graphics, text, and other data from the communication infrastructure 1006 (or from a frame buffer not shown) for display on a display unit 1030. Computer system 1000 also includes a main memory 1008, preferably random access memory (RAM), and may also include a secondary memory 1010. The secondary memory 1010 may include, for example, a hard disk drive 1012 and/or a removable storage drive 1014, representing a floppy disk drive, a magnetic tape drive, an optical disk drive, a universal serial bus (USB) flash drive, etc. The removable storage drive 1014 reads from and/or writes to a removable storage unit 1018 in a well-known manner. Removable storage unit 1018 represents a floppy disk, magnetic tape, optical disk, USB flash drive etc., which is read by and written to removable storage drive 1014. As will be appreciated, the removable storage unit 1018 includes a computer usable storage medium having stored therein computer software and/or data.

Alternative aspects of the present invention may include secondary memory 1010 and may include other similar devices for allowing computer programs or other instructions to be loaded into computer system 1000. Such devices may include, for example, a removable storage unit 1022 and an interface 1020. Examples of such may include a program cartridge and cartridge interface (such as that found in video game devices), a removable memory chip (such as an erasable programmable read only memory (EPROM), or programmable read only memory (PROM)) and associated socket, and other removable storage units 1022 and interfaces 1020, which allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a Personal Computer Memory Card International Association (PCMCIA) slot and card, etc. Software and data transferred via communications interface 1024 are in the form of signals 1028, which may be electronic, electromagnetic, optical or other signals capable of being received by communications interface 1024. These signals 1028 are provided to communications interface 1024 via a communications path (e.g., channel) 1026. This path 1026 carries signals 1028 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1080, a hard disk installed in hard disk drive 1070, and signals 1028. These computer program products provide software to the computer system 1000. The invention is directed to such computer program products.

Computer programs (also referred to as computer control logic) are stored in main memory 1008 and/or secondary memory 1010. Computer programs may also be received via communications interface 1024. Such computer programs, when executed, enable the computer system 1000 to perform the features in accordance with aspects of the present invention, as discussed herein. In particular, the computer programs, when executed, enable the processor 1004 to perform the features in accordance with aspects of the present invention. Accordingly, such computer programs represent controllers of the computer system 1000.

In an aspect of the present invention where the invention is implemented using software, the software may be stored in a computer program product and loaded into computer system 1000 using removable storage drive 1014, hard drive 1012, or communications interface 1020. The control logic (software), when executed by the processor 1004, causes the processor 1004 to perform the functions described herein. In another aspect of the present invention, the system is implemented primarily in hardware using, for example, hardware components, such as application specific integrated circuits (ASICs). Implementation of the hardware state machine so as to perform the functions described herein will be apparent to persons skilled in the relevant art(s).

In yet another aspect of the present invention, the invention is implemented using a combination of both hardware and software.

Figure 11:
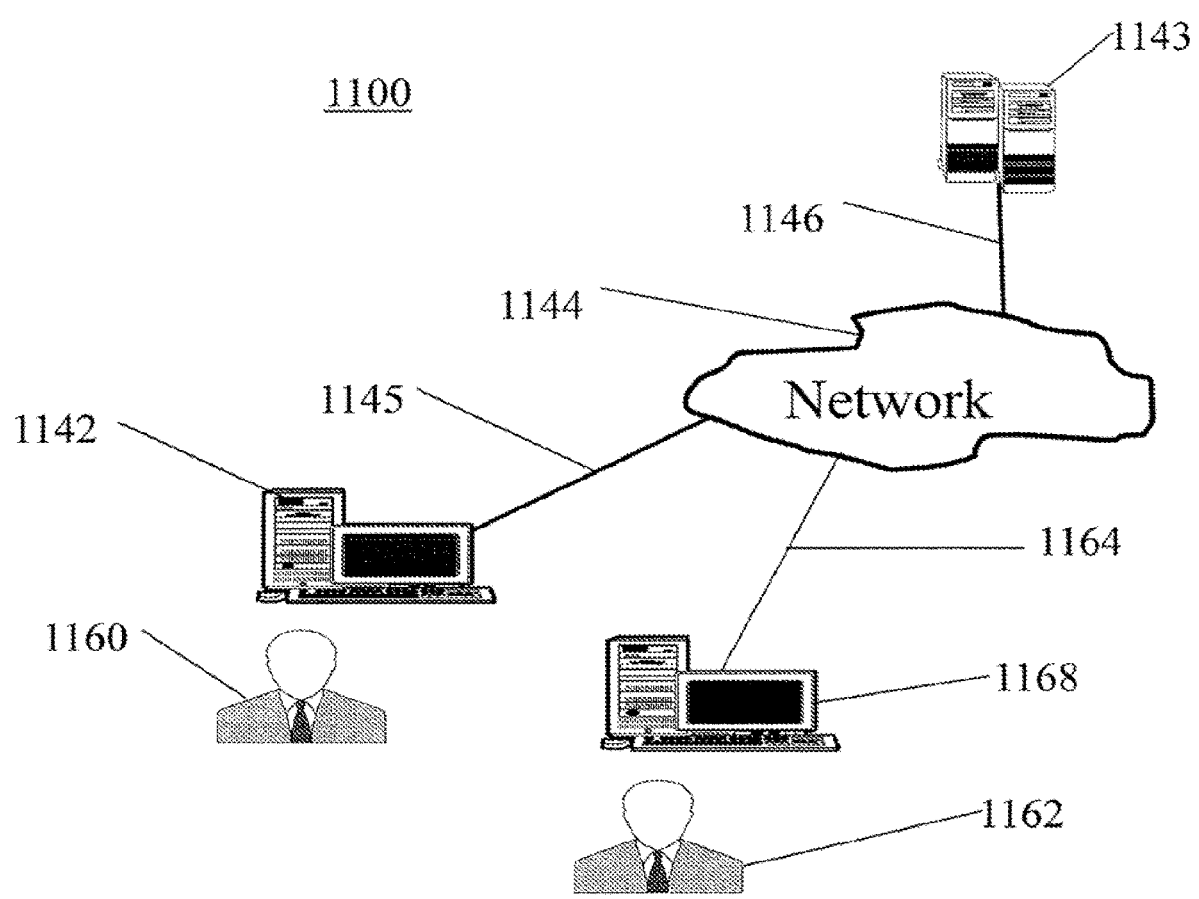
FIG. 11 illustrates an example system diagram of various hardware components and other features for use in accordance with aspects of the present invention.

FIG. 11 shows a communication system 1100 usable in accordance with aspects of the present invention. The communication system 1100 includes one or more accessors 1160, 1162 (also referred to interchangeably herein as one or more "users") and one or more terminals 1142, 1166. In one aspect of the present invention, data for use is, for example, input and/or accessed by accessors 1160, 1164 via terminals 1142, 1166, such as personal computers (PCs), minicomputers, mainframe computers, microcomputers, telephonic devices, or wireless devices, such as personal digital assistants ("PDAs") or a hand-held wireless devices coupled to a server 1143, such as a PC, minicomputer, mainframe computer, microcomputer, or other device having a processor and a repository for data and/or connection to a repository for data, via, for example, a network 1144, such as the Internet or an intranet, and couplings 1145, 1146, 1164. The couplings 1145, 1146, 1164 include, for example, wired, wireless, or fiberoptic links. In another aspect of the present invention, the method and system of the present invention operate in a stand-alone environment, such as on a single terminal.

While aspects of the present invention have been described in connection with examples thereof, it will be understood by those skilled in the art that variations and modifications of the aspects of the present invention described above may be made without departing from the scope hereof. Other aspects will be apparent to those skilled in the art from a consideration of the specification or from a practice in accordance with aspects of the invention disclosed herein.

What is claimed is:

1. A method for enhancing a digital content experience, the method comprising:
   receiving a video transcript file with a text transcript of a video;
   identifying one or more keywords in the text transcript of the video;

extracting, via interpretation of the one or more keywords, and using time markers corresponding to the one or more keywords, one or more key concepts corresponding to the one or more time markers in the video;

retrieving one or more potential related content items corresponding to the extracted key concepts, wherein the potential related content items are retrieved from a source external to the video and the video transcript file, wherein the external source of the potential related content items is a first content provider;

applying one or more content rules to define relationships between the extracted key concepts and facets of the potential related content items to determine related content items for the extracted key concepts;

retrieving a different type of potential related content items corresponding to the extracted key concepts to determine related content items for the extracted key concepts from a second content provider if the potential related content is not available from the first content provider, wherein the second content provider has a highest ranking of a plurality of content providers and the ranking is determined by applying the one or more content rules to the plurality of content providers;

associating the determined related content items to the time markers corresponding to the extracted key concepts;

generating a content feed comprising the related content items and the video transcript file; and transmitting the content feed and the video for contemporaneous presentation on a digital device.

2. The method of claim 1, wherein the one or more content rules apply one of a ranking standard and a quality standard to the potential related content items.

3. The method of claim 1, wherein at least one key concept is extracted via an interpretation of two or more keywords in the text transcript of the video.

4. The method of claim 1, further comprising:
revising the related content items in the content feed based upon received feedback associated with the related content items.

5. An apparatus for enhancing a digital content experience, the apparatus comprising at least one computer processor configured to:
receive a video transcript file with a text transcript of a video;
identify a plurality of specific terms in the text transcript of the video;
classify each of the plurality of specific terms into one or more entities using one or more extraction rules;
associate each of the entities with a time marker in the video transcript file corresponding to one or more of the specific terms;
retrieve potential related content items from an external source to the video and the video transcript file for the entities, wherein the external source of related content item providers is a first content provider;
apply one or more content rules to define relationships between entities and facets of the potential related content items to determine related content items for the entities;
retrieve a different type of potential related content items corresponding to entities from a second content provider if the potential related content is not available from the first content provider, wherein the second content provider has a highest ranking of a plurality of content providers and the ranking is determined by applying the one or more content rules to the plurality of content providers;
associate the determined related content items to the time markers associated with the entities;
generate a content feed with the related content items and the video transcript file; and
transmit the content feed and the video for contemporaneous presentation on a digital device.

6. The apparatus of claim 5, wherein the one or more content rules apply one of a ranking standard and a quality standard to the potential related content items.

7. The apparatus of claim 5, wherein at least one of the entities corresponds to a combination of two specific terms in the text transcript of the video.

8. The apparatus of claim 5, further comprising:
an optimization component operable to revise the related content items in the content feed based upon received feedback associated with the related content items.

9. A system for enhancing a digital content experience, the system comprising at least one computer processor, the at least one computer processor configured to execute instructions for:
receiving, at the processor, a video transcript file comprising a text transcript of a video and entities corresponding to time markers in the video transcript file, wherein the entities are created by identifying and classifying specific words in the text transcript of the video;
retrieving, using the processor, related content items for the entities in the video transcript file, wherein the related content items are from a source external to the video and the video transcript file,
wherein the external source of related content item providers is a first content provider;
applying, using the processor, one or more content rules to define relationships between entities and facets of potential related content items to determine related content items for entities;
retrieving, using the processor, a different type of the potential related content items to determine related content items corresponding to entities from a second content provider if the potential related content is not available from the first content provider, wherein the second content provider has a highest ranking of a plurality of content providers and the ranking is determined by applying the one or more content rules to the plurality of content providers;
associating, using the processor, the determined related content items to the time markers for the entities; and
generating, using the processor, a content feed with the related content items and the video transcript file;
transmitting, using the processor, the content feed and the video for contemporaneous presentation on a digital device.

10. The system of claim 9, wherein the one or more content rules apply one of a ranking standard and a quality standard to the potential related content item.

* * * * *